(12) United States Patent
Schedlbauer et al.

(10) Patent No.: US 11,312,573 B2
(45) Date of Patent: Apr. 26, 2022

(54) METHOD AND DISPENSING STATION FOR DISTRIBUTING ARTICLES

(71) Applicant: TGW Logistics Group GmbH, Marchtrenk (AT)

(72) Inventors: Michael Johannes Schedlbauer, Hengersberg (DE); Harald Johannes Schroepf, Wels (AT)

(73) Assignee: TGW Logistics Group GmbH, Marchtrenk (AT)

( * ) Notice: Subject to any disclaimer, the term of this patent is extended or adjusted under 35 U.S.C. 154(b) by 210 days.

(21) Appl. No.: 16/470,690

(22) PCT Filed: Dec. 19, 2017

(86) PCT No.: PCT/AT2017/060336
§ 371 (c)(1),
(2) Date: Sep. 5, 2019

(87) PCT Pub. No.: WO2018/112490
PCT Pub. Date: Jun. 28, 2018

(65) Prior Publication Data
US 2020/0002094 A1    Jan. 2, 2020

(30) Foreign Application Priority Data
Dec. 21, 2016 (AT) ............... A 51172/2016

(51) Int. Cl.
*G06F 7/00* (2006.01)
*B65G 1/137* (2006.01)
(Continued)

(52) U.S. Cl.
CPC ........... *B65G 1/1375* (2013.01); *B65G 67/02* (2013.01); *G07F 17/12* (2013.01)

(58) Field of Classification Search
CPC .... B65G 1/1375; B65G 67/02; B65G 1/1378; G07F 17/12; G06Q 10/0836; G06Q 10/087
(Continued)

(56) References Cited

U.S. PATENT DOCUMENTS 2,521,727 A  9/1950 Kappen
3,811,579 A  5/1974 Black
(Continued)

FOREIGN PATENT DOCUMENTS

AU   2008100784 A4   9/2008
CN      104843408 A   8/2015
(Continued)

OTHER PUBLICATIONS

Ullrich, Günter "Fahrerlose Transportsysteme. Eine Fibel—mit Praxisanwendungen zur Technik—für die Planung", 2014, pp. 43-79, with explanation of relevance.
(Continued)

*Primary Examiner* — Yolanda R Cumbess
(74) *Attorney, Agent, or Firm* — Collard & Roe, P.C.

(57) ABSTRACT

In a method and arrangement for distributing articles, an order management system acquires an order for delivering articles, the articles to be delivered are transferred from an article store and the articles included in an order are order-picked into at least one mobile shelf unit shelf compartment. The mobile shelf unit is subsequently transported to a dispensing station including a first article storage region separated by a first separating wall and a customer access region and is brought into a handover position, in which the at least one shelf compartment is accessible via a closeable opening in the first separating wall. When an article dispensing system receives a request for picking up the articles by a person or a machine associated therewith, it uncovers (Continued)

the closeable opening if authorization exists for picking up the articles. Alternatively a loadings robot can load the articles to be delivered into the machine.

45 Claims, 19 Drawing Sheets

(51) Int. Cl.
    *B65G 67/02*     (2006.01)
    *G07F 17/12*     (2006.01)

(58) Field of Classification Search
    USPC .................. 700/213–216, 228, 230–231
    See application file for complete search history.

(56) References Cited

U.S. PATENT DOCUMENTS

| | | | |
|---|---|---|---|
| 4,884,935 | A | 12/1989 | Smith et al. |
| 7,689,316 | B1* | 3/2010 | Frederick ............... G07F 9/002 700/232 |
| 9,120,624 | B1 | 9/2015 | Cassady et al. |
| 2006/0250056 | A1 | 11/2006 | Fitzgerald |
| 2008/0272565 | A1 | 11/2008 | Fitzgerald et al. |
| 2015/0294525 | A1 | 10/2015 | Broom et al. |
| 2017/0036859 | A1 | 2/2017 | Lopes Ribeiro |
| 2018/0290829 | A1* | 10/2018 | Schroepf ................. B65G 1/10 |

FOREIGN PATENT DOCUMENTS

| | | |
|---|---|---|
| DE | 197 16 138 A1 | 10/1998 |
| DE | 10 2005 032 533 A1 | 1/2007 |
| DE | 10 2006 025 934 A1 | 12/2007 |
| DE | 20 2011 102 784 U1 | 12/2011 |
| FR | 2 675 130 A1 | 10/1992 |
| FR | 2 898 793 A1 | 9/2007 |
| JP | H02-158515 A | 6/1990 |
| JP | H06-144530 A | 5/1994 |
| JP | 2015-219629 A | 12/2015 |
| WO | 2008/044952 A2 | 4/2008 |
| WO | 2014/116947 A1 | 7/2014 |
| WO | 2015/112035 A1 | 7/2015 |
| WO | 2016/185094 A1 | 11/2016 |

OTHER PUBLICATIONS

International Search Report in PCT/AT/2017/060336, dated Aug. 14, 2018.
Ullrich, Günter "Fahrerlose Transportsysteme. Eine Fibel—mit Praxisanwendungen zurTechnik—für die Planung", 2014, pp. 43-79.
AmazonRobotics "Our Vision"—Video https://www.amazonrobotics.com, downloaded Jun. 18, 2019.

* cited by examiner

METHOD AND DISPENSING STATION FOR DISTRIBUTING ARTICLES

CROSS REFERENCE TO RELATED APPLICATIONS

This application is the National Stage of PCT/AT2017/060336 filed on Dec. 19, 2017, which claims priority under 35 U.S.C. § 119 of Austrian Application No. A 51172/2016 filed on Dec. 21, 2016, the disclosure of which is incorporated by reference. The international application under PCT article 21(2) was not published in English.

BACKGROUND OF THE INVENTION

1. Field of the Invention

The invention relates to a method for distributing articles, in which an order for delivering articles is acquired by an order management system, the articles to be delivered are transferred from an article store and the articles included in an order are order-picked into at least one shelf compartment of a mobile shelf unit. Furthermore, the invention relates to a dispensing station for distributing articles including a first article storage region, a customer access region as well as a first separating wall separating the first article storage region and the customer access region from each other and comprising at least one closeable opening. Furthermore, the dispensing station includes an article dispensing system configured to receive a request for picking up the articles by a person or a machine associated with the person and
a) to uncover the closeable opening if said person or said machine is authorized for picking up the articles, or
a) to instruct a loading robot of the dispensing station to load the articles to be delivered into said machine if said person or said machine is authorized for picking up the articles.

2. Description of the Related Art

Such method and such dispensing station are known in principle from the prior art. For example, mobile shelf units are used by mail-order companies for supporting their order-picking process. In this case, articles are usually deposited homogeneously, and not related to orders, in a shelf unit and the articles included in an order are order-picked from the shelf unit into a shipping carton.

One example of a dispensing station of the above-mentioned kind is a self-service kiosk where articles are deposited secured behind small closed doors. An article dispensing system receives a request for picking up the articles, for example via a scanner or an input keyboard, and releases the small door associated with the articles, if there is authorization for picking up the articles.

Also known are dispensing stations which are equipped with a storage and retrieval machine (S/R machine) taking the requested articles out of a fixed shelf unit and conveying them to a release location, if there is authorization for picking up the articles. Such dispensing station often comprises only one door at the release location, which will be opened for picking up the articles. However, in principle several storage and retrieval machines and/or release locations can be provided.

Moreover, DE 10 2005 032 533 A1 discloses a movable shelf unit with several shelves and several optical displays, wherein one optical display is associated with each shelf in order to mark the shelf as needed. During the order-picking process, a commodity to be deposited in the shelf is delivered to the order picker, a shelf determined for the commodity is marked with the help of the optical display and the commodity is subsequently deposited in the marked shelf.

The systems known from the prior art have several drawbacks:

- The known procedure is bound to using loading aids, in particular using shipping containers, in which the articles included in an order are pooled.
- In the known procedure and the known system, very often the entire order, and thus the total weight of the order, must be manipulated, for example when loading a goods vehicle which transports the articles located in the shipping carton away from the dispatch center, when unloading at a local distribution center, when loading a goods vehicle which carries out the delivery or when loading a self-service kiosk. This is tiring for the persons who carry out this work and detrimental to their health in the long run.
- A dispensing station of a conventional design comprises a large number of permanent fixtures and is often very winding. The dispensing station can therefore not be cleaned in a simple manner, which is a drawback when storing foodstuffs and perishable products. This applies in particular to dispensing stations comprising a storage and retrieval machine and permanently mounted (high) racks/shelf units.
- The shape of the dispensing station cannot be easily adapted to existing conditions. In particular dispensing stations with a storage and retrieval machine necessarily have a longitudinal, rectangular layout due to the (straight) rails on which the storage and retrieval machine moves. Under certain circumstances, such dispensing station can be only poorly integrated into the surroundings.
- The performance (i.e. the number of articles dispensed per unit of time) of a dispensing station with a storage and retrieval machine depends directly on the performance of the storage and retrieval machine. Often, a conventional dispensing station comprises a single storage and retrieval machine and a single article dispensing opening. If several customers come to pick up articles at the same time, this may result in long waiting periods. In addition, this known system is poorly scalable, inflexible and not fail-safe.

SUMMARY OF THE INVENTION

It is therefore one object of the invention to specify an improved method and an improved dispensing station for distributing articles. In particular, some or all of the above-mentioned drawbacks are to be overcome.

The object of the invention is achieved by means of a method of the kind mentioned at the beginning, wherein
the mobile shelf unit is transported to a dispensing station comprising a first article storage region separated by a first (fixed-installation) separating wall and a customer access region and is brought into a handover position in the first article storage region, in which position the at least one shelf compartment is accessible via a closeable opening in the first separating wall, and
an article dispensing system receives a request for picking up the articles by a person or a machine associated with the person, and
a) uncovers the closeable opening if said person or said machine is authorized for picking up the articles or b) the articles to be delivered are (taken out of the at least one shelf compartment and) loaded into said machine by a loading robot if said person or said machine is authorized for picking up the articles.

Furthermore, the object of the invention is achieved by means of a dispensing station of the kind mentioned at the beginning including a mobile shelf unit which is in a handover position, in which at least one shelf compartment of the mobile shelf unit is accessible via the closeable opening in the first (fixed-installation) separating wall.

In the proposed procedure and/or the proposed dispensing station, the order-picked articles thus remain advantageously in the mobile shelf unit from the order-picking process to the dispensing of the articles to the customer.

The machine for picking up articles can in particular be configured as an aerial drone, and the dispensing station can comprise a landing site for this aerial drone. In this case, the loading robot is configured to load the aerial drone. However, it is also conceivable that the machine for picking up articles is configured as an autonomous, mobile vehicle and the dispensing station comprises a parking site for this vehicle as well as, in particular, an entrance gate or an entrance door to this parking site. In this case, the loading robot is configured to load the autonomous vehicle.

It is furthermore conceivable that a machine takes over the articles, but a person is authorized for take over. For example, a person can come to the dispensing station together with a machine, for example with an autonomous or semi-autonomous vehicle. It would be conceivable, for example, that the operation of autonomous vehicles is forbidden—for example under legal provisions—or is only allowed subject to the condition that the autonomous vehicles be monitored by a person. In this case, both a person authorized for take over and the transferring machine would be present at the dispensing station.

Preferably, the dispensing station includes at least two elements from the group: closeable opening, loading robot, entrance gate for an autonomous vehicle, landing site for an aerial drone. This ensures particularly flexible use of the dispensing station.

For example, multi-axis and/or gantry robots with grippers taking the articles to be dispensed out of the shelf compartment and conveying them into a cargo space of the aerial drone or of the autonomous vehicle can serve as loading robots. Of course it is also conceivable that the aerial drone or the autonomous vehicle itself has a mechanism for picking up the articles.

In an embodiment, the loading robot is formed by an ejector adapted to move, in particular to push, the articles located in a shelf compartment through the closeable opening of the separating wall. For handing over the articles, the autonomous vehicle stops in front of the relevant closeable opening, and the articles located in the shelf compartment and to be dispensed are pushed, with the help of the ejector, through the closeable opening of the separating wall into a cargo space of the autonomous vehicle authorized for transfer. The ejector can be configured, for example, as a hydraulic cylinder, pneumatic cylinder or electric spindle motor, and on the rear wall of the mobile shelf unit a motor-operated cover can be disposed, which normally closes the opening in the rear wall. The cover can also be actuated directly by the ejector.

The new system has several advantages over the prior art:
The articles can be placed directly into the mobile shelf unit without using loading aids. Also the use of a shipping container is effectively not necessary, but the ordered articles can simply be deposited in the shelf compartment associated with the order. In this way, even bulky and large-volume articles which are inherently too big for (standardized) loading aids can be handled. However, the use of a loading aid, in particular a shipping container (e.g. a paper bag, a plastic bag, a shipping carton, etc.) is not excluded. In such case, for the order-picking process an empty shipping container is advantageously deposited in the shelf compartment associated with the order, and the articles included in the order are order-picked into the shipping container.

During order picking, as a result of the proposed procedure, the weight of the total order never needs to be manipulated (in particular lifted), but only the weight of the individual articles. The order-picking process is therefore considerably more ergonomic and less strenuous for a person carrying out the order picking. However, manipulation of filled shipping containers is not in principle excluded. Rather, it is also conceivable that the shipping container is filled with the articles included in an order and lifted into the mobile shelf unit (in particular in machine/automated order picking). The same is essentially true for the manipulation of the order following the order picking. Also here, the weight of the relevant articles need not be lifted, as the relevant articles can remain in the mobile shelf unit.

A dispensing station comprises only few permanent fixtures and includes primarily mobile shelf units. The dispensing station can therefore very easily be completely evacuated for cleaning purposes. This ensures that high hygiene standards, for example when storing foodstuffs and perishable articles, can be achieved.

The shape of the dispensing station can easily be adapted to existing conditions and can comprise, for example, an L-shaped layout. In contrast to this, dispensing stations with a storage and retrieval machine, as a general rule, are bound to a rectangular-shaped layout due to the straight rails on which the storage and retrieval machine moves. In the system here proposed, performance does not depend on the shape of the dispensing station but predominantly on the size of the surface area.

The performance (i.e. the number of articles dispensed per unit of time) of the dispensing station does not depend on the performance of a storage and retrieval machine. As is known, a conventional dispensing station often comprises a single storage and retrieval machine and a single article dispensing opening. In contrast to this, the proposed dispensing station can comprise a plurality of article dispensing openings, which ensures that several customers can be served and/or handled in parallel at the same time.

Other designs and further developments of the invention become apparent from the dependent claims as well as from the description in combination with the figures.

Preferably, the loaded mobile shelf unit is loaded into a goods vehicle after the order picking of the articles, is transported to the dispensing station with the help of the goods vehicle and is unloaded from the goods vehicle at the dispensing station. Because the goods vehicle is loaded with the shelves directly, the loading and unloading can be carried out very quickly. Manipulation of individual shipping containers is obsolete. The proposed measures also facilitate the work of the person loading and unloading the goods vehicle, because this person need not carry the weight of the articles to be delivered. Instead, only the rolling resistance of a shelf unit needs be overcome, if a shelf unit with casters is used. By involving a goods vehicle and/or by involving public roads in the article distribution flow, an article distribution system is effectively divided up into an article store and the dispensing station.

It is also particularly preferable if the loaded mobile shelf unit is unloaded from the goods vehicle at a first loading dock of the dispensing station and a different, in particular empty, mobile shelf unit is loaded into the goods vehicle at a second loading dock of the dispensing station. This improves the workflow during delivery of filled mobile shelf units to the dispensing station and/or during removal of empty, or essentially empty, shelf units from the dispensing station. In particular, at the scheduled arrival time of the goods vehicle at the dispensing station, the area at the first loading dock can be kept clear, so that the filled mobile shelf units can be easily unloaded, and/or empty mobile shelf units can already be deposited at the second loading dock, so that the empty mobile shelf units (or mobile shelf units containing return articles), can be easily loaded into the goods vehicle.

It is also particularly preferable if the mobile shelf unit is temporarily connected to another mobile shelf unit during loading into the goods vehicle and/or during unloading from the goods vehicle. In this way, several mobile shelf units can be unloaded from the goods vehicle or loaded into the goods vehicle in a single operation. In particular, the mobile shelf unit can, for this purpose, be equipped with a coupling, with the help of which the mobile shelf unit is temporarily connectable to another mobile shelf unit. The coupling can for example be mechanical or work according to the electromagnetic principle. The loading and unloading of a group of coupled mobile shelf units can for example be carried out manually or by means of a motorized (in particular autonomous) industrial truck. It is also possible to use a cable winch located in the pick-up station or in the goods vehicle. In this case, the coupled mobile shelf units are pulled out of the goods vehicle using the cable winch. The loading of the goods vehicle can be carried out in an analog manner.

Preferably, the loaded mobile shelf unit is transported into the handover position in the first article storage region and/or at the separating wall with the help of an industrial truck, in particular with the help of an autonomous industrial truck. This allows for the dispensing station to be operated in a fully automated manner By using several industrial trucks, the dispensing station is moreover largely fail-safe, in marked contrast to a conventional dispensing station with a single storage and retrieval machine. By using any number of industrial trucks, the dispensing station is moreover well scalable and flexibly adaptable to changing needs and requirements. For example vehicles with a lifting unit (in particular with a lifting fork or a lifting strut), but also vehicles which do not lift but merely pull or push the mobile shelf units for conveyance, come into question as industrial trucks. The industrial truck is in particular self-propelled. The industrial truck can furthermore be railborne, but is in particular non-railborne. In addition, the industrial truck can remain in the handover position during an article handover operation or leave beforehand.

It is also particularly preferable if the loaded mobile shelf unit is transported, with the help of the industrial truck, into a second article storage region located away from said first separating wall and is brought into the handover position from there when the article dispensing system receives a relevant request for picking up the articles located inside the mobile shelf unit, in particular if the requesting person or the requesting machine is authorized for transfer. In this way, mobile shelf units not currently needed for dispensing articles can be interim-stored in a second article storage region. The second article storage region can be arranged separate from the first article storage region and the handover position. Alternatively, the second article storage region can be directly adjacent to the first article storage region and the handover position.

In this case, space for mobile shelf units may be provided at both sides of the first article storage region and/or the handover position. In this case, two or even more mobile shelf units can be simultaneously shifted back and forth, in particular when these are coupled with one another. In this way, for example one of three mobile shelf units can be brought into a handover position by simple shifting of the group of shelf units. Evidently, this process also works for a different number of mobile shelf units and/or handover positions. If, for example, two transfer positions are provided in the area of five mobile shelf units arranged behind one another, two of the five mobile shelf units can accordingly be simultaneously brought into a handover position, and so on.

The proposed procedure can also be applied analogously if the area of the separating wall occupied by openings extends horizontally shorter than the shelf compartments of the mobile shelf unit are wide. For example, it is possible that only one column of openings arranged vertically above one another is provided in the separating wall while the mobile shelf unit comprises several columns of shelf compartments arranged above one another. By horizontally shifting the mobile shelf unit or a group of shelf units, one of the columns of shelf compartments arranged above one another is then brought in alignment with the openings in the separating wall.

Generally, the mobile shelf unit is equipped with casters, in particular with driven and/or braked casters, as well as with and without steerable casters. In this way, the mobile shelf unit can be easily shifted back and forth. Yet it is conceivable that the mobile shelf unit has conventional shelf posts and does not comprise casters. The mobile shelf unit must then be lifted for transport, for example by means of a lifting unit of an industrial truck.

Furthermore, it is particularly preferable if the mobile shelf unit comprises an accumulator, a drive control coupled with the driven casters, and sensors for spatial orientation connected to the drive control, in particular an element, or several elements, from the group: camera, ultrasonic sensor, laser scanner, triangulation receiver (GPS, indoor GPS) and/or magnetic-field sensor. The driven casters have for example a hub motor which is connected to the drive control. Also a steering motor is connected to the drive control. Furthermore, the drive control is connected to the sensors for spatial orientation. The described system enables autonomous movement of the mobile shelf unit. The method for controlling autonomous vehicles is known in principle and is not described here in detail. In particular, the same or a similar method as is known for industrial trucks can be used for the mobile shelf unit. As the mobile shelf unit can move autonomously in the dispensing station, industrial trucks will in principle be obsolete. However, it is also conceivable to have the industrial trucks take over special or assistance tasks.

For example, a self-propelled mobile shelf unit comprising a driving motor, with the help of the driving motor, may
- travel into the goods vehicle and/or
- travel out of the goods vehicle and/or
- travel into the handover position in the first article storage region and/or
- travel into the second article storage region.

In a further embodiment, the dispensing station includes a lifting device for the mobile shelf unit arranged in the first article storage region. Accordingly, the mobile shelf unit is moved vertically into the handover position by means of a lifting device arranged in the first article storage region. This is particularly advantageous when the area in the separating wall occupied by the openings extends vertically shorter than the shelf compartments of mobile shelf unit are tall. For example, the separating wall can comprise only one row (line) of openings while the mobile shelf unit comprises two or more storage levels. With the help of the lifting device any storage level can be moved to the level of the openings in the separating wall and the transfer of articles can be enabled. The lifting device can for example comprise a hydraulic cylinder, pneumatic cylinder or electric spindle motor or be formed by same.

Moreover, the dispensing station preferably comprises a sorting robot configured in particular as a railborne single-level or multi-level storage and retrieval machine and configured to take the articles to be delivered from the at least one shelf compartment of the mobile shelf unit and deposit them into at least one shelf compartment of a different shelf unit. Accordingly, the articles to be delivered are taken out of the at least one shelf compartment of the mobile shelf unit and deposited into at least one shelf compartment of a different shelf unit by the sorting robot. Evidently, also other designs can be provided as a sorting robot, for example a gantry robot or a multi-axis robot.

Several shelf units are within the range of action of the sorting robot. If the sorting robot is configured as a multi-level storage and retrieval machine, the multi-level storage and retrieval machine can be moved along the rail for access to the shelf units, and/or a loading platform can be moved vertically along a mast. The method of operation of a multi-level storage and retrieval machine is known in principle and is therefore not explained in detail. It would also be conceivable to use several single-level storage and retrieval machines in combination with an elevator or paternoster instead of one multi-level storage and retrieval machine. In principle, however, also other designs of the sorting robot are conceivable. For example, the sorting robot can be configured as a multi-axis robot with a gripper or a gantry robot with a gripper. The elevator or the paternoster can be provided for transport of articles, transport of an empty single-level storage and retrieval machine and/or of a loaded single-level storage and retrieval machine.

With the help of the sorting robot articles to be delivered can now be taken out of a shelf compartment of a source shelf unit and deposited into a shelf compartment of a target shelf unit. The target shelf unit can be a fixed shelf unit or a mobile shelf unit. It is also possible, of course, to rearrange the articles from a shelf compartment of a shelf unit into another shelf compartment of the same shelf unit. In this way, the articles can be redistributed in such a way that the mobile shelf units are either empty or, if possible, fully loaded. The empty mobile shelf units can subsequently be deposited in groups in the vicinity of a loading dock, so that a subsequent loading process of a goods vehicle can be carried out swiftly. The shelf units to be loaded into the goods vehicle must evidently not all be (completely) empty but can for example contain return articles.

A bottom edge of the fixed shelf unit may be located higher than a top edge of the mobile shelf unit. In this way, the mobile shelf units can be positioned under the fixed shelf units and/or be pushed through below the fixed shelf units. It is therefore very easy to bring mobile shelf units into the range of action of the sorting robot as needed, for example after unloading from the goods vehicle or when some of the articles have been dispensed from the mobile shelf unit and the mobile shelf unit is now only partially filled.

In the presented re-sorting process preferably the second, other shelf unit is configured as a mobile shelf unit and takes the place of the first mobile shelf unit with regard to the storing and dispensing of the articles to be delivered. If the articles are rearranged from one mobile shelf unit into another mobile shelf unit, the articles of course need not be re-loaded into the mobile shelf unit (source shelf unit) in which the articles were originally located before being dispensed at the openings. Instead, the mobile target shelf unit can be directly brought into the handover position at the openings. The mobile target shelf unit thus takes the place of the mobile source shelf unit with regard to the storing and dispensing of the articles to be delivered. This process can be repeated recursively any number of times, so that a mobile target shelf unit can, at a later point in time, itself become a mobile source shelf unit again and so on.

In addition, the sorting robot can also serve another purpose. It is in principle conceivable that the articles to be delivered are taken out of the at least one shelf compartment of a (mobile) shelf unit by the sorting robot, which is in particular configured as a railborne single-level or multi-level storage and retrieval machine, and directly handed over to a requesting person or a requesting machine, if said person or said machine is authorized for picking up the articles. This can be done for example by moving the relevant articles into a special transfer region and opening an access door to this special transfer region. In this case, the transport of the mobile shelf unit into the handover position is obsolete. This alternative procedure can for example be selected when sensitive and/or bulky articles are to be dispensed. In this case, the sorting robot in principle also fulfills the function of a dispensing robot.

The dispensing station may comprise a first loading dock for transfer of the loaded mobile shelf unit out of a goods vehicle and a second loading dock for handover of another, in particular empty, mobile shelf unit into the goods vehicle, wherein the two loading docks are arranged in particular in the direction of rails of a railborne storage and retrieval machine or in the direction of transport of a conveying device for the mobile shelf units (roller conveyor, cable winch) at opposite sides of the dispensing station. In this variant of the method presented, empty mobile shelf units, or mobile shelf units containing return articles, are deposited at the second loading dock or successively emptied by the sorting robot by rearranging the articles. At the first loading dock, in contrast, space for filled mobile shelf units is kept clear. When the goods vehicle loaded with filled mobile shelf units arrives at the dispensing station, the filled mobile shelf units are unloaded from the goods vehicle in the manner described further above. The goods vehicle subsequently travels to the second loading dock and loads, there, the empty mobile shelf units or mobile shelf units containing return articles. When two goods vehicles are used, the unloading of the first goods vehicle and the loading of the second goods vehicle can even be carried out simultaneously. For example, new filled mobile shelf units are conveyed into the dispensing station at the first loading dock and empty mobile shelf units or mobile shelf units containing return articles are conveyed into the second goods vehicle as part of the same step. In this case, the mobile shelf units from the first goods vehicle and the mobile shelf units already located in the dispensing station (in particular in the range of action of a storage and retrieval machine) form a queue, as it were, of mobile shelf units, which moves out of the first goods vehicle and into the second goods vehicle. In this way, the loading and unloading can be carried out in a particularly efficient manner. In this process, generally, not all mobile shelf units need be conveyed from the (first) goods vehicle into the dispensing station, nor all mobile shelf units out of the dispensing station into the (second) goods vehicle. Some of the mobile shelf units can of course remain in the goods vehicle and/or in the dispensing station.

The mobile shelf unit may also comprise at a rear side a shelf compartment end wall and the at least one shelf compartment is arranged adjacent to the shelf compartment end wall and is accessible only from one side of the mobile shelf unit. In this way, on the one hand the articles located in the shelf compartment are prevented from falling out at the back of the mobile shelf unit and on the other hand a person picking up the articles is prevented from gaining unauthorized access to the inside of the dispensing station beyond the shelf compartment.

The mobile shelf unit may comprise a central shelf compartment separating wall, and at least one shelf compartment each is disposed at both sides of the shelf compartment separating wall, each of which is accessible only from one side of the mobile shelf unit. In this way, the mobile shelf unit can be positioned with its front side or its rear side facing towards the closeable openings in the separating wall, depending on the shelf compartment in which the articles to be dispensed are stored. It is also an advantage that the capacity compared with a unilaterally accessible mobile shelf unit is practically doubled with regard to the number of orders accommodated.

In this context, the dispensing station preferably
includes a second (fixed-installation) separating wall separating the first article storage region and the customer access region from each other and comprising at least one closeable opening, and
the mobile shelf unit is in a handover position, in which a first shelf compartment of the mobile shelf unit is accessible via the closeable opening in the first separating wall and a second shelf compartment of the mobile shelf unit, which is separated from the first shelf compartment by means of the central separating wall, is accessible via the closeable opening in the second separating wall.

In this embodiment variant, there is thus a first separating wall with first closeable openings at the front side of the mobile shelf unit and a second separating wall with second closeable openings at the rear side. The shelf compartments located at both sides of the central shelf compartment separating wall are therefore accessible in principle at the same time. This practically doubles the capacity of the dispensing station (i.e. the number of article transfer operations that are possible per unit of time) compared with a single separating wall with closeable openings. The proposed design of the dispensing station is suited in particular for smaller buildings. In particular, the outer wall of the dispensing station can essentially comprise a U-shaped layout which can accommodate a mobile shelf unit or several mobile shelf units and otherwise comprise essentially only an access gate and a roof.

Finally, the first article storage region and/or the second article storage region may be air-conditioned. In this way, the dispensing station presented is suited in particular for storing foodstuffs and perishable articles. Evidently, also zones of different temperatures can be provided to be able to store for example foodstuffs of different kinds under favorable conditions.

Preferably, the mobile shelf unit comprises a hanger rod for accommodating hanging garments and/or hanging bags. In this case, the use of a hanger rod is not bound to the distribution of items of clothing, but the hanging bags can also contain articles of a general kind. In particular, the hanging bags can be configured as single-use hanging bags which the customer can take away when picking up the articles. However, the hanging bag can also be attached to the hanger rod in a manner undetachable by the customer, so that the customer can take away only the articles but not the hanging bag.

Preferably, the mobile shelf unit
comprises individually configurable shelf unit separating walls and/or rear walls and/or compartment shelves and/or hanger rods or
comprises several modules with shelf compartments of different sizes which are connectable to one another.

For example, said modules can be joined by means of a toollessly producible and releasable plug-and-socket connection. The modules can comprise different numbers of shelf compartments and/or hanger rods. For example, it is possible that modules with 1×3 shelf compartments, with 2×2 compartments or with 2×1 compartments are provided. Alternatively or in addition it is conceivable that grooves are provided in a base body of the shelf unit into which compartment shelves or shelf unit separating walls can be individually inserted. Instead of the grooves, of course also other support means, for example support pins or support battens, can be provided for the compartment shelves and shelf unit separating walls. The compartments can be of the same size or of different sizes.

Preferably, the mobile shelf unit comprises an electronic memory or an electronic circuit in which information regarding the shape and/or the geometrical structure of the mobile shelf unit is stored. This variant is particularly advantageous when shelf units of different shapes are involved in the process for dispensing articles in the dispensing station, and in particular when the shelf units can be individually combined. This stored information can for example be transmitted to the article dispensing system, which can subsequently uncover openings matched to the shelf compartments.

Preferably, the mobile shelf unit comprises switching contacts with the help of which the position of a shelving board disposed in the mobile shelf unit or of a shelf unit separating wall disposed in the mobile shelf unit or of a hanger rod disposed in the mobile shelf unit can be captured/acquired. This information can then be forwarded, wired or via radio, to the electronic memory/the electronic circuit of the shelf unit, which then makes it available for example to the article dispensing system.

Preferably, the dispensing station includes an optical or electronic detection device configured to capture/acquire a shape and/or a geometrical structure of the mobile shelf unit. Accordingly, in the method presented preferably an optical or electronic detection device captures/acquires a shape and/or a geometrical structure of the mobile shelf unit and transmits it to the article dispensing system. This variant is particularly advantageous when shelf units of different shapes are involved in the process for dispensing articles in the dispensing station, and in particular when the shelf units can be individually combined. For example, a camera, a scanner and depth measurement sensors as well as electronic receivers receiving, via radio, information regarding the shape and/or the geometrical structure of the mobile shelf unit (for example from the electronic circuit disposed at the shelf unit which stores this information and reports it onward) can be provided as detection devices.

Preferably, a dispensing station for distributing articles includes
- a first article storage region,
- a customer access region,
- a first separating wall separating the first article storage region and the customer access region from each other and comprising at least one closeable opening,
  - a shelf unit with several shelf compartments which are accessible via the at least one closeable opening in the first separating wall, and
  - an article dispensing system configured to receive a request for picking up the articles by a person or a machine associated with the person and
  - to uncover the closeable opening if said person or said machine is authorized for picking up the articles,
  - wherein the article dispensing system is configured to uncover, individually and depending on a request for picking up the articles, a continuous opening of variable size, which is, in particular, associated with a continuous shelf compartment.

Accordingly, also a method for distributing articles preferably includes the steps:
- order-picking of the articles included in an order into at least one shelf compartment of a shelf unit,
- wherein the shelf unit is transported into a handover position in a first article storage region of a dispensing station or is disposed there, wherein the dispensing station comprises the first article storage region separated by a first separating wall and a customer access region, and wherein the at least one shelf compartment in the handover position of the shelf unit is accessible via a closeable opening in the first separating wall,
- wherein an article dispensing system receives a request for picking up the articles by a person or a machine associated with the person and uncovers the closeable opening if said person or said machine is authorized for picking up the articles, and
- wherein the article dispensing system uncovers, individually and depending on the request for picking up the articles, a continuous opening of variable size, which is in particular associated with a continuous shelf compartment.

With this embodiment, when shelf units of different shapes are involved in the process for dispensing articles in the dispensing station, and in particular when the shelf units are individually combined, the separating wall can be individually adjusted to the shelf units, enabling articles of different sizes to be dispensed in a flexible manner Over time, the size of an uncovered opening in a specific (fixed) position can therefore be varied.

The above system is directed at scenario a) (releasing the closeable opening if a person or a machine is authorized for picking up the articles). Evidently, the article dispensing system of the dispensing station can also be configured to instruct a loading robot of the dispensing station to take the articles to be delivered out of the at least one shelf compartment and load them into said machine if said person or said machine is authorized for picking up the articles (scenario b). In addition, the method can also include acquiring an order for delivering articles by means of an order management system and transferring the articles to be delivered from an article store.

Although the application of the above-mentioned dispensing station and/or the above-mentioned method may have the features according to one aspect of the invention, such dispensing station or such method can in principle also be applied without these features and can therefore form the basis of an independent invention.

It should also be noted in this context that the shelf unit of the above-mentioned dispensing station and/or the above-mentioned method can be arranged in a fixed manner in relation to the separating wall. Evidently, the shelf unit can also be configured as a mobile shelf unit moveable in relation to the separating wall and be movable into a handover position, in which at least one shelf compartment of the mobile shelf unit is accessible via the closeable opening in the first separating wall.

Preferably, the separating wall comprises several swing doors for closing the openings and the article dispensing system is configured to release, at a request for picking up the articles, several adjacent swing doors associated with this request. Accordingly, in a method for distributing articles preferably the article dispensing system releases, at a request for picking up the articles, several adjacent swing doors disposed in the separating wall and associated with this request. This uncovers a relatively large continuous opening in the separating wall and enables access to a relatively large shelf compartment associated with the order. In this way, different-sized openings can be uncovered for different-sized articles. The swing doors can in particular be released individually, in horizontally adjacent pairs, in vertically adjacent pairs or in a matrix (e.g.: 2×2 doors)—depending on the size of the shelf compartment located behind them. It is also possible in principle to uncover a for example L-shaped opening. The swivel axes of the swing doors can be aligned vertically, horizontally or in a mix of vertically and horizontally. Preferably, at least some of the swing doors are hinged in opposite pairs (i.e. their swivel axes are arranged opposite each other), as it is then particularly easy to uncover a continuous opening of variable size. The swing doors can be of the same size or of different sizes.

It should be noted in this respect that separating walls are known in the prior art which comprise different-sized doors which are always each individually associated with an order and/or a shelf compartment. While different-sized openings are releasable with the help of these known separating walls as well, openings of variable and/or individual size are not. In contrast to this, in the proposed method the uncovered opening involving a specific door can have different sizes. Over time, a specific door is therefore involved in uncovering openings of different sizes. Separating walls with doors each of which are always individually associated with an order and in which the opening associated with a specific door has always the same size are therefore not protected under the proposed system in which the article dispensing system uncovers, individually and depending on the request for picking up the articles, a continuous opening of variable size. Separating walls with doors each of which are always individually associated with an order and in which the opening associated with a specific door has always the same size can, however, be protected under other systems set out as part of this patent application.

Preferably, the article dispensing system, at a request for picking up the articles, activates a swivel axis associated with this request of several swivel axes of a swing door and deactivates the remaining swivel axes of this swing door. For example, the swivel axes of the swing doors are formed by shifting and in particular electromagnetically driven bolts which are controlled by the article dispensing system. In this way, a pair of doors can be formed either with an adjacent left-hand swing door or with an adjacent right-hand swing door. To that end, one time the right-hand swivel axis of the relevant central swing door is activated while the left-hand swivel axis is deactivated, and another time the left-hand swivel axis of the relevant central swing door is activated while the right-hand swivel axis is deactivated. Alternatively or in addition a top swivel axis and a bottom swivel axis can be individually activated.

Furthermore, the separating wall preferably comprises several sliding doors or roll-up doors for closing the opening, which are arranged in opposite pairs, and the article dispensing system is configured to position the sliding doors or the roll-up doors at a request for picking up the articles in such a way that an opening associated with said request is uncovered. Accordingly, in a method for distributing articles preferably the article dispensing system, at a request for picking up the articles, positions several sliding doors or roll-up doors of the separating wall in pairs in such a way that an opening associated with said request is uncovered. The proposed measures enable the size and position of the uncovered opening to be varied practically continuously. In this case, however, it should be kept in mind that the position and size of the uncovered opening essentially correspond to the shelf compartment disposed behind it. The driving of the sliding doors or the roll-up doors can be carried out for example electrically, pneumatically or hydraulically. With regard to the above-mentioned function, sliding doors or the roll-up doors are essentially equivalent; roll-up doors, however, take up somewhat less installation space. The sliding doors or the roll-up doors can be of the same size or of different sizes.

Specifically, in the dispensing station, i) a pair of sliding doors or roll-up doors can be provided whose direction of movement is horizontally or vertically aligned and which are arranged opposite each other in relation to said direction of movement, or ii) a first pair of sliding doors or roll-up doors can be provided whose direction of movement is horizontally aligned and which are arranged opposite each other in relation to this horizontal direction of movement, and a second pair of sliding doors or roll-up doors can be provided whose direction of movement is vertically aligned and which are arranged opposite each other in relation to this vertical direction of movement, wherein the first pair and the second pair are arranged transversely to said horizontal and said vertical direction of movement behind each other, or iii) a pair of sliding doors or roll-up doors can be provided whose direction of movement is aligned horizontally or vertically and which are arranged opposite each other in relation to this horizontal or vertical direction, and several swing doors can be provided, wherein the sliding doors or the roll-up doors and the swing doors are arranged transversely to said horizontal or vertical direction of movement behind one another.

In the sliding doors or the roll-up doors arranged opposite each other, the opening located between the sliding doors or the roll-up doors becomes smaller when the sliding doors or the roll-up doors move toward each other in the relevant direction of movement and becomes larger when the sliding doors or the roll-up doors move away from each other in the relevant direction of movement.

When several closing elements (swing door, sliding door, roll-up door) are arranged behind one another, the opening uncovered by a first closing element can be covered at least partially by a second closing element located behind (or in front of) it. In scenarios ii) and iii) the size and position of the uncovered opening can therefore be varied multi-dimensionally.

Preferably, at least one sliding door or roll-up door comprises individually movable grate bars or closing plates which are movable into a closed position in which they cover a shelf compartment and are movable into an open position in which they uncover a shelf compartment. Accordingly, it is advantageous in a method for distributing articles if the article dispensing system, at a request for picking up the articles, positions grate bars or closing plates of the sliding doors or roll-up doors in such a way that an opening associated with said request is uncovered. In particular, the direction of movement of the grate bars or closing plates can be identical with the direction of movement of said sliding door or roll-up door. Furthermore, it is conceivable that the grate bars or closing plates are moved in groups. The driving of the grate bars/closing plates can be carried out for example electrically, pneumatically or hydraulically. In a roll-up door, for systemic reasons the grate bars or closing plates are preferably designed flexibly, in a sliding door they can alternatively be rigid.

Preferably, a goods vehicle has a cargo space and at least one mobile shelf unit accommodated in the cargo space, in which the cargo space comprises conveying means on which the at least one mobile shelf unit is supported, wherein are provided as conveying means:

free-running and/or driven conveyor rollers and/or a free-running and/or driven conveyor belt and/or a free-running and/or driven conveyor chain.

Accordingly, also in a method for loading and/or unloading mobile shelf units into or from a cargo space of a goods vehicle, preferably the mobile shelf units are moved into the cargo space or out of the cargo space with the help of driven conveyor rollers disposed in the cargo space and/or using a driven conveyor belt disposed in the cargo space and/or using a driven conveyor chain disposed in the cargo space.

The proposed measures enable loading and unloading of a goods vehicle in a particularly easy manner Specifically, also shelf units without casters and/or without their own drive can be unloaded from the goods vehicle or loaded into the goods vehicle in an easy manner.

It should be noted in this context that, while the application of such goods vehicle may have the features of one aspect of the invention, such goods vehicle can in principle also be applied without these features and can therefore form the basis of an independent invention.

Preferably, the conveying means are disposed in a load bed/floor area of the cargo space or on suspension rails/support rails provided in the cargo space. Accordingly, the shelf units are standing on the (load-bearing) conveying means, i.e. the conveyor rollers, conveyor belts or conveyor chains or are mounted and moved suspended/hanging on the suspension rails/support rails. For easier movement of the shelf units the suspension rails/support rails can also comprise conveyor rollers, conveyor belts or conveyor chains. When suspension rails/support rails are used, the floor of the cargo space remains free from conveying means, which makes it easy for industrial trucks and other vehicles to move on the rails.

Preferably, the goods vehicle includes a cable winch and/or a winch for loading the mobile shelf units into the cargo space and/or for unloading the mobile shelf units from the cargo space. Accordingly, in a method for loading and/or unloading mobile shelf units into or from a cargo space of a goods vehicle, preferably the mobile shelf units are moved into the cargo space or out of the cargo space with the help of a cable winch and/or a winch. Application of a cable winch/winch is particularly advantageous when the shelf units have free-running casters or when free-running conveyor rollers, conveyor belts or conveyor chains are provided in the goods vehicle/in the dispensing station. Driven conveyor rollers, conveyor belts or conveyor chains for moving the shelf units will then be obsolete due to the cable winch. If the cable is redirected accordingly, one and the same cable winch/winch can be used both for loading the goods vehicle and for unloading the goods vehicle. It is also possible to use an endless revolving cable, in particular in connection with a winch.

The cargo space may be disposed in a container which is detachable from the goods vehicle. In this case, the goods vehicle need not be parked at the loading dock for the entire duration of the loading or unloading process. Instead, the container comprising the cargo space can be deposited at the loading dock and be reloaded onto the goods vehicle after the loading or unloading process.

Preferably, the dispensing station includes a loading dock with conveying means whose conveying direction is aligned in extension of a parking area for a goods vehicle disposed at the loading dock, wherein are provided as conveying means:
 free-running and/or driven conveyor rollers and/or
 a free-running and/or driven conveyor belt and/or
 a free-running and/or driven conveyor chain.

Accordingly also in a method the mobile shelf units may be moved into a cargo space of a goods vehicle parked in the parking area in the region of a loading dock of the dispensing station or out of this cargo space with the help of driven conveyor rollers disposed in the dispensing station and/or using a driven conveyor belt disposed in the dispensing station and/or using a driven conveyor chain disposed in the dispensing station.

The proposed measures enable loading and unloading of a goods vehicle in a particularly easy manner Specifically, also shelf units without casters and/or without their own drive can be unloaded from the goods vehicle or loaded onto the goods vehicle in an easy manner.

Preferably, the conveying means are disposed in a floor area of the loading dock of the dispensing station or on suspension rails/support rails provided in the region of the loading dock of the dispensing station. Accordingly, the shelf units are standing on the (load-bearing) conveying means, i.e. the conveyor rollers, conveyor belts or conveyor chains, or are mounted and moved suspended/hanging on the suspension rails/support rails. For easier movement of the shelf units the suspension rails/support rails can comprise conveyor rollers, conveyor belts or conveyor chains. When suspension rails/support rails are used, the floor of the dispensing station remains free from conveying means, which makes it easy for industrial trucks and other vehicles to move on the rails.

The dispensing station may also include a cable winch and/or a winch for moving the mobile shelf units toward the parking area for the goods vehicle and/or for moving the mobile shelf units away from said parking area. Accordingly, also in a method for loading and/or unloading mobile shelf units into or from a cargo space, the mobile shelf units may be moved into a cargo space of a goods vehicle parked in a parking area in the region of a loading dock of the dispensing station or out of this cargo space with the help of a cable winch disposed in the dispensing station and/or a winch disposed in the dispensing station. Application of a cable winch/winch is particularly advantageous when the shelf units have free-running casters or when free-running conveyor rollers, conveyor belts or conveyor chains are provided in the goods vehicle/in the dispensing station. Driven conveyor rollers, conveyor belts or conveyor chains for moving the shelf units will then be obsolete due to the cable winch. If the cable is redirected accordingly, one and the same cable winch/winch can be used both for loading the goods vehicle and for unloading the goods vehicle. It is also possible to use an endless revolving cable, in particular in connection with a winch.

It should also be noted in this context that the embodiment variants presented of the presented dispensing station and the resulting advantages analogously relate to the disclosed method and vice versa.

BRIEF DESCRIPTION OF THE DRAWINGS

For the purpose of better understanding of the invention, it will be elucidated in more detail by means of the figures below.

FIG. 5*a* shows a detail of the dispensing station depicted in FIG. 5 in a front view;

DETAILED DESCRIPTION OF THE PREFERRED EMBODIMENTS

In the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position. Furthermore, also individual features or feature combinations from the different exemplary embodiments shown and described may represent independent inventive solutions or solutions in accordance with the invention.

Figure 1:
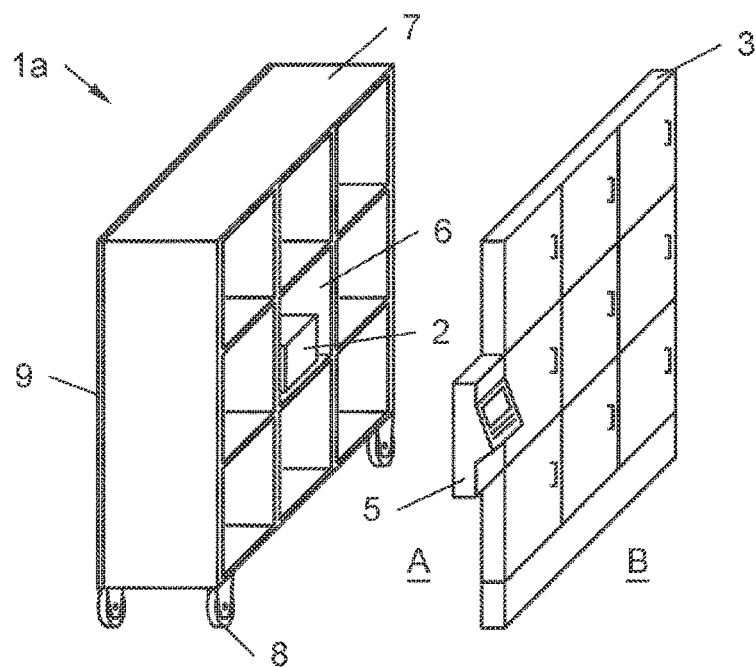
FIG. 1 shows a first example of a dispensing station with a unilaterally accessible mobile shelf unit positioned somewhat apart from and in front of a separating wall with closeable openings.
Figure 2:
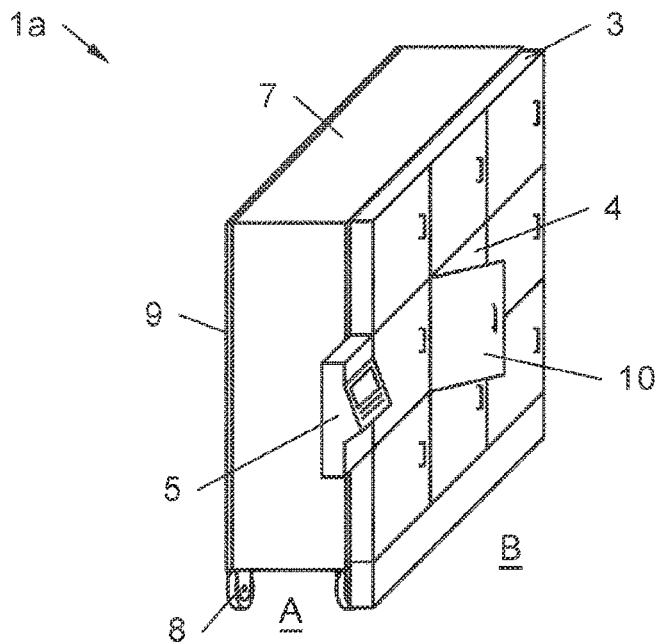
FIG. 2 shows the dispensing station shown in FIG. 1 with the mobile shelf unit in handover position.

FIGS. 1 and 2 show a first example of a dispensing station 1a for distributing articles 2. The dispensing station 1a includes a first article storage region A, a customer access region B as well as a first (fixed-installation) separating wall 3 separating the first article storage region A and the customer access region B from each other and comprising several closeable openings 4. Furthermore, the dispensing station 1a includes an article dispensing system 5. The dispensing system 5 comprises a receiving module configured to receive a request for picking up an article 2 by a person or a machine associated with a person and a control module configured to uncover the closeable opening 4 if said person or said machine is authorized for picking up the article 2. The receiving module is connected with the control module.

The article(s) 2 is/are located in a shelf compartment 6 of a mobile shelf unit 7, which in the example shown is equipped with casters 8 and comprises at a rear side a shelf compartment end wall 9. The shelf compartment 6 is arranged adjacent to the shelf compartment end wall 9 and thus accessible only from one side of the mobile shelf unit 7. Some or all of the casters 8 can be steerable and/or braked. Moreover, it can altogether be provided that the mobile shelf unit 7 can operate autonomously (see FIG. 17).

FIG. 1 shows the arrangement 1 in a state in which the mobile shelf unit 7 is deposited somewhat apart from the separating wall 3. In FIG. 2, in contrast, the mobile shelf unit 7 is in a handover position in which the shelf compartments 6 of the mobile shelf unit 7 are accessible via the closeable openings 4 in the first separating wall 3. Assuming that there is authorization for picking up the articles 2, the door 10 was released by the control module of the article dispensing system 5 and is depicted in the opened state in FIG. 2. As depicted in FIGS. 1 and 2, the article dispensing system 5 further can comprise a user interface having a screen and a keyboard. Of course it is also possible to use a touch screen or other input means as user interface. The user interface is connected with the receiving module to receive a request for picking up an article 2, input at the user interface.

Figure 3:
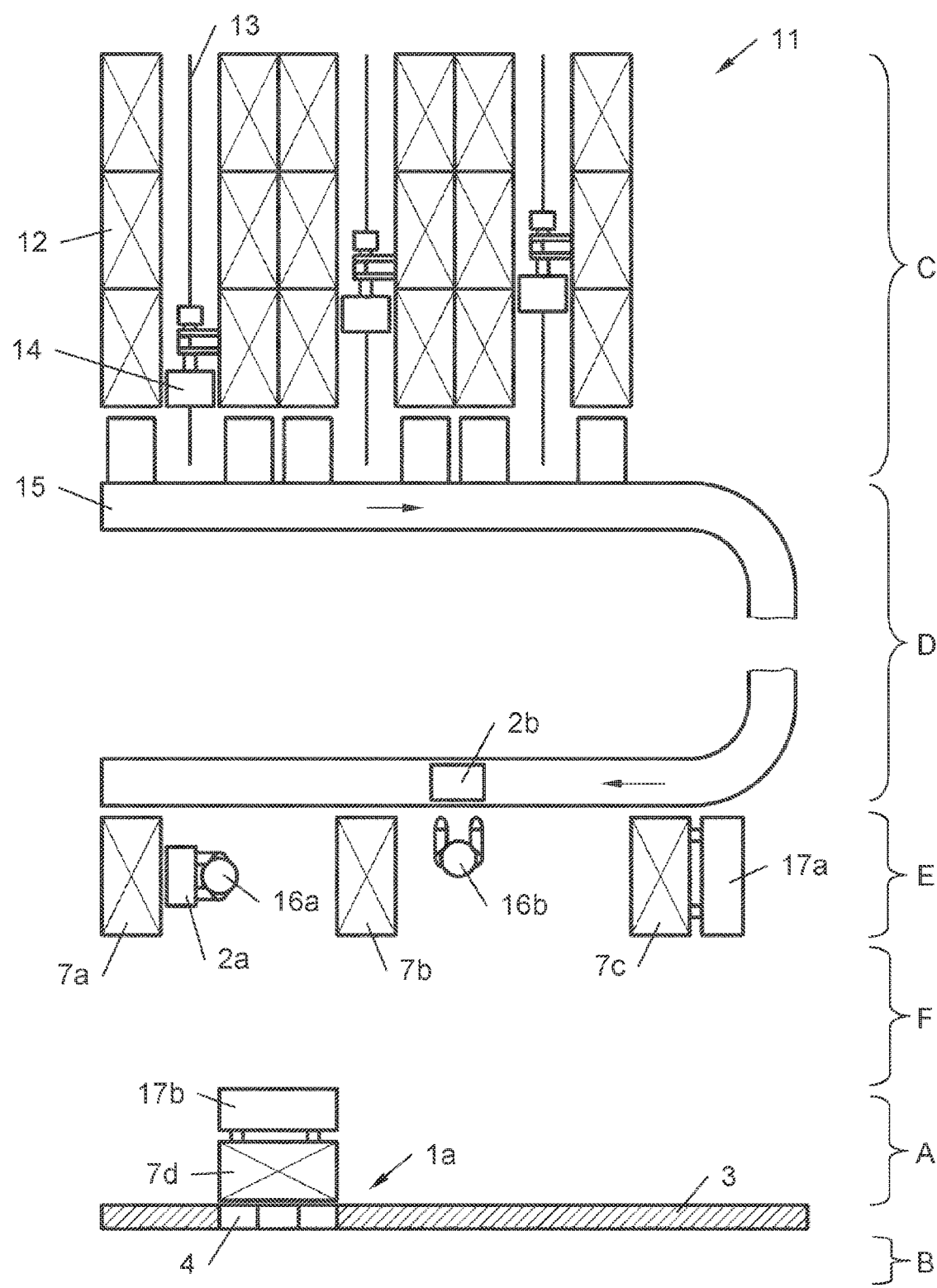
FIG. 3 shows a schematically depicted example of an article distribution system with a dispensing station in a plan view.

FIG. 3 shows an example of how the dispensing station 1a can be integrated with an article distribution system 11 and/or an article distribution flow. Specifically, FIG. 3 shows, to that end, a schematic plan view of the article distribution system 11 including a high rack storage region C, a first conveyance region D, a order-picking region E, a second conveyance region F, as well as the first article storage region A and the customer access region B.

In the high rack storage region C are located several high racks 12 with rails 13 laid between them and storage and retrieval machines 14 movable on rails 13. In the first conveyance region D is located a conveyor track 15, which can be configured for example as a roller conveyor. In the order-picking region E are located several mobile shelf units 7a ... 7c as well as two workers 16a, 16b and a first industrial truck 17a. Finally, in the article storage region A is located a second industrial truck 17b with a mobile shelf unit 7d. The customer access region B and the first article storage region A, in turn, are separated from each other by a first fixed-installation separating wall 3 comprising several closeable openings 4. The industrial trucks 17a, 17b are self-propelled in this example. The industrial trucks 17a, 17b can furthermore be railborne, while being—as in the present example—in particular non-railborne.

Here, an exemplary method for distributing articles 2a, 2b includes the following steps: In a first step, an order for delivering articles 2a, 2b is acquired by means of or in an order management system. The order management system, which is part of the dispensing station 1a or is coupled with dispensing station 1a (in this respect see FIGS. 4 and 5), includes for example a parent computer. This computer knows which articles 2a ... 2b are to be delivered to which customer. This computer can also have information on which article(s) 2a, 2b is/are stored in which compartment of the high rack 12. Of course, also two separate computers can be provided for the mentioned functions. The storage and retrieval machines 14 are controlled in a manner known in principle to transfer the articles 2a, 2b to be delivered pursuant to an order from the article store (here formed by the high racks 12). In a next step, the articles 2a, 2b are transported to the order-picking region D with the help of the conveyor track 15. Advantageously, this is done in a manner sorted according to orders. In a next step, the articles 2a, 2b included in an order are deposited in a shelf compartment 6 of a mobile shelf unit 7a, 7b. In the depicted example, the worker 16a specifically deposits the article(s) 2a in the mobile shelf unit 7a. With the help of industrial trucks 17a, 17b the filled mobile shelf units 7a . . . 7d are transported to the dispensing station 1a as needed. The dispensing station 1a comprises the first article storage region A and customer access region B, as already described in FIGS. 1 and 2, which are separated from each other by a first separating wall 3.

The first separating wall 3 is configured for example as shown in FIGS. 1 and 2 and comprises several closeable openings 4, as well as an article dispensing system 5. In FIG. 3, the mobile shelf unit 7d was brought into a handover position in the first article storage region A by the industrial truck 17b, in which position the shelf compartments 6 are accessible via the closeable openings 4 in the first separating wall 3. As soon as the article dispensing system 5 receives a request for picking up the article(s) 2a by a person or a machine associated with the person and said person or said machine is authorized for picking up the article(s) 2a, it uncovers the closeable opening 4. During an article handover operation, the industrial truck 17b can remain in the handover position or it can leave beforehand.

The transport region F can also be configured differently and include in particular public roads. This effectively divides the article distribution system 10 into an article store 12 and the dispensing station 1a.

Figure 4:
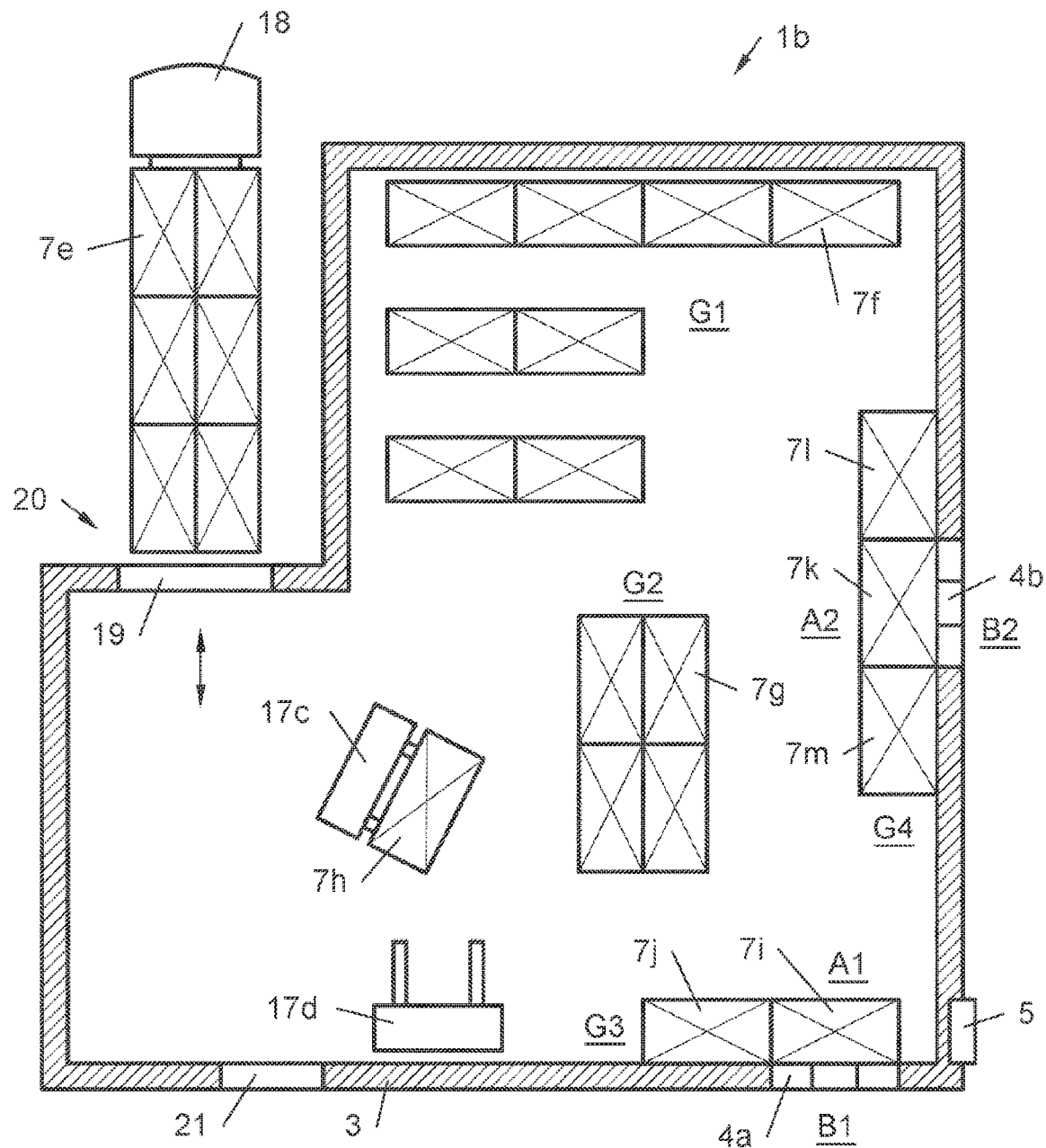
FIG. 4 shows an example of a dispensing station in a plan view.

FIG. 4 shows an example of this, in which the loaded mobile shelf units 7a . . . 7d, after the order-picking of the articles 2a, 2b, are loaded into a goods vehicle 18 in an article store 12, transported to the dispensing station 1b with the help of the goods vehicle 18 and unloaded again from the goods vehicle 18 at the dispensing station 1b. The article store 12 and the dispensing station 1b, therefore, are located separately, wherein a transport system, here in particular a goods vehicle 18, connects the article store 12 to the dispensing station 1d.

The dispensing station 1b includes a building with the (separating) wall 3, which on the one hand separates the first article storage regions A1, A2 from the customer access regions B1, B2 as described above and, in the present example, in addition comprises a gate 19 at a first loading dock 20 as well as an access door 21. In this example, two groups of closeable openings 4a and 4b are provided in addition, which are disposed on different outer walls 3 of the building. The article dispensing system 5 is in this example not disposed directly by the closeable openings 4a and 4b, but the article dispensing system 5 associated with the closeable openings 4a and 4b is located in a separate location. In addition to the first article storage regions A1, A2 the dispensing station 1b finally includes several second article storage regions G1 . . . G4.

An exemplary procedure for distributing articles 2a, 2b is as follows:

The filled mobile shelf units 7e are unloaded from the goods vehicle 18 at the first loading dock 20. The unloading of mobile shelf units 7e from the goods vehicle 18 can be done for example a shelf unit at a time, or several mobile shelf units 7e can be unloaded together. To allow unloading of several mobile shelf units 7e in one step, the mobile shelf units 7e can comprise couplings (see also FIGS. 9 and 10), for temporarily connecting several mobile shelf units 7e to one another. Subsequently, the mobile shelf units 7e can be pulled out of the goods vehicle 18 for example by means of an industrial truck 17c, 17d or with the help of a cable winch (not depicted) disposed opposite the gate 19.

In a further step, the filled mobile shelf units 7e are conveyed to the second article storage regions G1 and G2 and deposited there. Preferably, this is done with the help of the industrial trucks 17c, 17d, but the step can also be carried out manually.

The second article storage regions G1 and G2 are not necessarily in the position depicted in FIG. 4, but the building can also be divided into other second article storage regions. In particular, the shape, size and position of the second article storage regions G1 and G2 can be adapted to different building layouts and/or to different situations. Specifically, the second article storage regions G1 and G2 can also be modified over time. Also, it is a particular advantage of the system presented that the building can be completely evacuated within a brief period of time, for example in order to be cleaned. This is particularly advantageous when perishable foodstuffs are manipulated in the dispensing station 1b. The building contains only few permanent fixtures and is otherwise filled effectively only with mobile shelf units 7f . . . 7m.

After unloading, the goods vehicle 18 is loaded with empty mobile shelf units 7f . . . 7m or mobile shelf units 7f . . . 7m containing return articles. This can be carried out analogously to the manner described above with respect to the unloading process. That means that the mobile shelf units 7f . . . 7m can be loaded into the goods vehicle 18 individually, or several, or even all, of the mobile shelf units 7f . . . 7m are loaded into the goods vehicle 18 in one step. To that end, the mobile shelf units 7f . . . 7m can be coupled with one another again. The loading, in turn, can be carried out manually, with the help of industrial trucks 17c, 17d or with a cable winch (not depicted) installed in the goods vehicle 18. For preparation of the loading process, the industrial trucks 17c, 17d can deposit empty mobile shelf units 7f . . . 7m or mobile shelf units 7f . . . 7m containing return articles grouped in a special second storage region G1, G2, in particular in direct vicinity of the loading dock 20, so that loading can be done very swiftly. The loaded goods vehicle 18 can now go back to the article store 12, where the empty mobile shelf units or mobile shelf units containing return articles are unloaded from the goods vehicle 18 and will be available for the next order-picking process.

When a pick-up of articles 2a, 2b is expected in the dispensing station 1b, for example because the pick-up of articles 2a, 2b was announced for a specific time, the relevant mobile shelf unit 7f . . . 7m is brought into a handover position in one of the first article storage regions A1, A2, or it can also be conveyed to a second storage region G3, G4. The second storage region G3 is located immediately next to the first article storage region A1 and/or immediately next to a handover position for the openings 4a. The second storage region G4 is located immediately next to the first article storage region A2 and/or immediately next to a handover position for the openings 4a.

When a request for picking up an article 2a, 2b is now received at the article dispensing system 5, it is checked whether there is authorization and whether the relevant mobile shelf unit 7f . . . 7m is already in a handover position. In the example depicted in FIG. 4, this is true for the mobile shelf units 7*i* and 7*k*. In this case, the opening 4*a*, 4*b* associated with the request can be uncovered directly to enable article transfer.

If the mobile shelf unit 7*f* . . . 7*m* containing the requested articles 2*a*, 2*b* is located in a second storage region G1 . . . G4, the mobile shelf unit 7*f* . . . 7*m* containing the requested articles 2*a*, 2*b* must first be brought into a handover position before the articles 2*a*, 2*b* can be dispensed.

If the mobile shelf unit 7*f* . . . 7*m* containing the requested articles 2*a*, 2*b* is located in a second storage region G3, G4 in the immediate vicinity of a handover position, which is true in the example shown for the mobile shelf units 7*j*, 7*l* and 7*m*, this process can be carried out very swiftly. If, for example, mobile shelf unit 7*j* is to be delivered to the openings 4*a*, all that is required is for the mobile shelf unit 7*i* to be moved somewhat away from the handover position and for the mobile shelf unit 7*j* to be pushed into the handover position. The process can be carried out particularly quickly if both industrial trucks 17*c*, 17*d* are involved in it.

It would also be conceivable that there is space for mobile shelf units 7*f* . . . 7*m* at both sides of the handover position, as is true for the handover position at the openings 4*b* in FIG. 4. In this case, two or even more mobile shelf units 7*k* . . . 7*m* can be simultaneously shifted back and forth, in particular when these are coupled with one another (compare also FIGS. 9 and 10).

In FIG. 4, one of the three mobile shelf units 7*k* . . . 7*m* can thus be brought into a handover position by simple shifting. Evidently, the process also works for a different number of mobile shelf units 7*k* . . . 7*m* and/or handover positions. If, for example, two transfer positions are provided in the area of five mobile shelf units 7*f* . . . 7*m* arranged behind one another, two of the five mobile shelf units 7*f* . . . 7*m* can accordingly be simultaneously brought into a handover position, and so on.

Mobile shelf units 7*f* . . . 7*g* which are not needed or are empty and/or are essentially empty are preferably conveyed to one of the second storage regions G1, G2 and deposited there.

Figure 5:
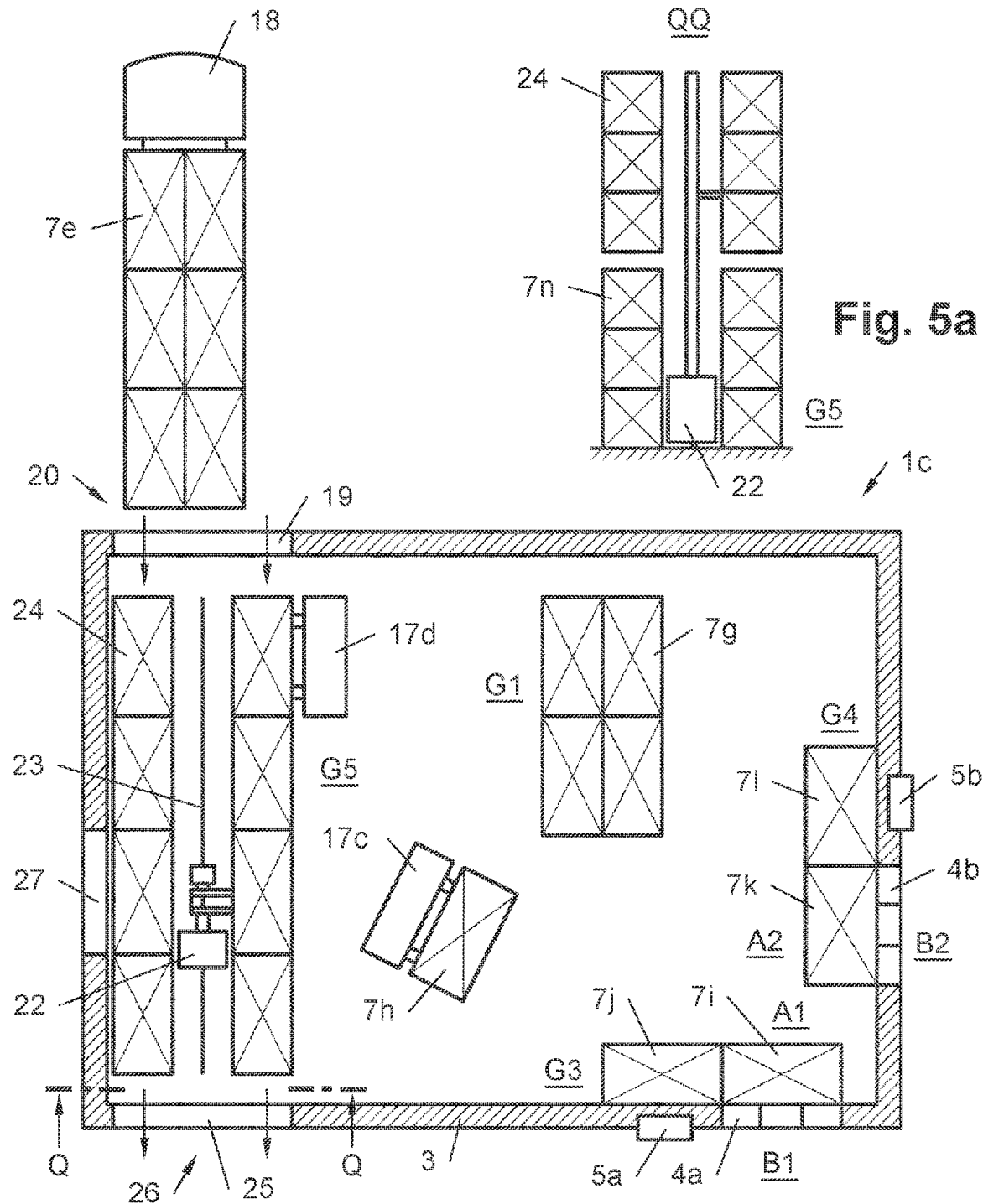
FIG. 5 shows an example of a dispensing station with a sorting robot in a plan view.

FIG. 5 now shows another example of a dispensing station 1*c* similar to the dispensing station 1*b* depicted in FIG. 4. In contrast to dispensing station 1*b* depicted in FIG. 4, however, the building of dispensing station 1*c* now has a different layout than the building of dispensing station 1*b*, and also the openings 4*b* are located in slightly different positions. One marked difference is also that the dispensing station 1*c* comprises a railborne multi-level storage and retrieval machine 22, which serves as a sorting robot and is movable on the rail 23. It would also be conceivable to use a single-level storage and retrieval machine or several single-level storage and retrieval machines, in particular in combination with an elevator or paternoster. The elevator or the paternoster can be provided for transport of articles, transport of an empty single-level storage and retrieval machine and/or of a loaded single-level storage and retrieval machine.

Several shelf units 24, 7*n* are within the range of action of the multi-level storage and retrieval machine 22. For access to the shelf units, the multi-level storage and retrieval machine 22 can be moved along the rail 23, and/or a loading platform can be moved vertically along a mast. The method of operation of a multi-level storage and retrieval machine 22 is known in principle and is therefore not explained in detail.

It can be derived from the front view QQ that the shelf units within the range of action of the multi-level storage and retrieval machine 22 in the specific example depicted are formed on the one hand by the fixed shelf units 24 and on the other hand by the mobile shelf units 7*n*. As is apparent from the front view QQ, a bottom edge of the fixed shelf unit 24 is located higher than a top edge of the mobile shelf units 7*n*. In this way, the mobile shelf units 7*n* can be pushed through below the fixed shelf units 24. This is a feature of the dispensing station 1*c* which, while being advantageous, is not mandatory.

An exemplary procedure for distributing articles 2*a*, 2*b* via the dispensing station 1*c* is as follows:

As described above in the context of the dispensing station 1*b*, filled mobile shelf units 7*e* are delivered by means of the goods vehicle 18 and unloaded at the first loading dock 20. The unloading can be done for example shelf unit by shelf unit, or several mobile shelf units 7*e* are unloaded together in one step. This, in turn, can be done by coupling and in particular using an industrial truck 17*c*, 17*d* or a cable winch. After unloading, the mobile shelf units 7*e* can in principle be deposited in the second article storage region G1, as described in the context of the dispensing station 1*b*. However, it is also particularly advantageous if the mobile shelf units 7*e*, after unloading, are deposited in the second article storage region G5, and thus within the range of action of the multi-level storage and retrieval machine 22.

With the help of the multi-level storage and retrieval machine 22, articles 2*a*, 2*b* to be delivered can now be taken from a shelf compartment 6 of a mobile shelf unit 7*n* (source shelf unit) and deposited into a shelf compartment 6 of another shelf unit. The other shelf unit (i.e. the target shelf unit) can be the fixed shelf unit 24 or another mobile shelf unit 7*n*. Of course it is also possible to rearrange the articles 2*a*, 2*b* from a shelf compartment 6 of a shelf unit 7*n*, 24 into another shelf compartment 6 of the same shelf unit 7*n*, 24, as well as to rearrange the articles 2*a*, 2*b* from a shelf compartment 6 of a fixed shelf unit 7*n* into another shelf compartment 6 of this or another fixed shelf unit 7*n*.

In this way, the articles 2*a*, 2*b* can be redistributed in such a way that the mobile shelf units 7*f* . . . 7*n* are either empty or, if possible, fully loaded. In this case, the empty mobile shelf units 7*f* . . . 7*n* can be deposited grouped in the second article storage region G1 or in the second article storage region G5, so that the subsequent loading of the goods vehicle 18 can be done swiftly. In this context it is particularly advantageous if the empty mobile shelf units 7*n* are deposited in the second article storage region G5 in the vicinity of the second gate 25 by the second loading dock 26.

The first loading dock 20 for transfer of the loaded mobile shelf units 7*e* from the goods vehicle 18 and the second loading dock 26 for handover of empty mobile shelf units 7*n* into the goods vehicle 18 are arranged here at opposite sides of the dispensing station 1*c*, specifically at opposite sides of the rail 23 of the railborne storage and retrieval machine 22. It would also be conceivable that the two loading docks 20 and 26 are arranged opposite each other in relation to a transport direction of a conveying device for the mobile shelf units 7*e*, for example a cable winch.

In this way, not only the unloading but also the loading of the goods vehicle 18 can be carried out in a particularly efficient manner. To that end, the empty mobile shelf units 7*n*, in turn, are conveyed into the goods vehicle 18 individually or in groups, in particular with the assistance of an industrial truck 17*c*, 17*d* or a cable winch, as has been described in detail in the context of the dispensing station 1*b* depicted in FIG. 4.

When two goods vehicles 18 are used, the unloading of the first goods vehicle 18 and the loading of the second goods vehicle (not depicted) can even be carried out simultaneously. For example, new, filled mobile shelf units 7e are conveyed into the dispensing station 1c at the first loading dock 20, and empty mobile shelf units 7n are conveyed into the second goods vehicle in the same step. In this case, the mobile shelf units 7e from the first goods vehicle 18 and the mobile shelf units already located in the dispensing station 1c within the range of action of the storage and retrieval machine 22 form a queue, as it were, of mobile shelf units 7e, 7n, which moves out of the first goods vehicle 18 and into the second goods vehicle. In this way, the loading and unloading can be carried out in a particularly efficient manner. In this process, generally, not all mobile shelf units 7e have to be conveyed out of the (first) goods vehicle 18 into the dispensing station 1c, nor all mobile shelf units 7n out of the dispensing station 1c into the second goods vehicle. Of course some of the mobile shelf units 7e can remain in the first goods vehicle 18 and/or in the dispensing station 1c.

When the articles 2a, 2b are rearranged from one mobile shelf unit 7n into another mobile shelf unit 7n, the articles 2a, 2b, of course, need not be reloaded into the mobile shelf unit 7n (source shelf unit) in which the articles 2a, 2b were originally located before being dispensed at the openings 4a, 4b. Instead, the mobile target shelf unit 7n can be brought directly into the handover position at the openings 4a, 4b. The mobile target shelf unit 7n thus takes the place of the mobile source shelf unit 7n with regard to the storing and dispensing of the articles 2a, 2b to be delivered. This process can be repeated recursively any number of times, so that a mobile target shelf unit 7n can, at a later point in time, itself become a mobile source shelf unit 7n, and so on.

It should be noted in this context that not all the shelf units 7f . . . 7n must be (completely) empty, but they can for example also contain return articles which are transported back to the article store with the help of the goods vehicle 18.

The multi-level storage and retrieval machine 22 can also serve another purpose. Articles 2a, 2b can be delivered directly to the optional handover opening 27 by the multi-level storage and retrieval machine 22 if a requesting person or a machine associated with this person is authorized for picking up the article(s) 2a, 2b. If this is the case, the requested articles 2a, 2b are transported to the handover opening 27, and an access door in the handover opening 27 is opened. In this case, the transporting of the mobile shelf unit 7f . . . 7n into the handover position is obsolete. This alternative procedure can for example be selected when delicate and/or bulky articles are to be dispensed. In this case, the multi-level storage and retrieval machine 22 has not only the function of a sorting robot but in principle also the function of a dispensing robot.

It should be noted in this context that the sorting robot 22, which possibly also serves as a dispensing robot, need not necessarily be provided as a storage and retrieval machine, but also other designs are conceivable. The sorting robot 22 can for example be formed by a multi-axis robot and/or gantry robot or include same (compare also FIG. 16).

In FIGS. 1 and 2 a mobile shelf unit 7 was presented and used in the examples of application presented in FIGS. 3 to 5, which comprises a shelf compartment end wall 9 at its rear side, making the shelf compartment 6 accessible only from one side of the mobile shelf unit 7. However, this is by no means the only conceivable option.

Figure 6:
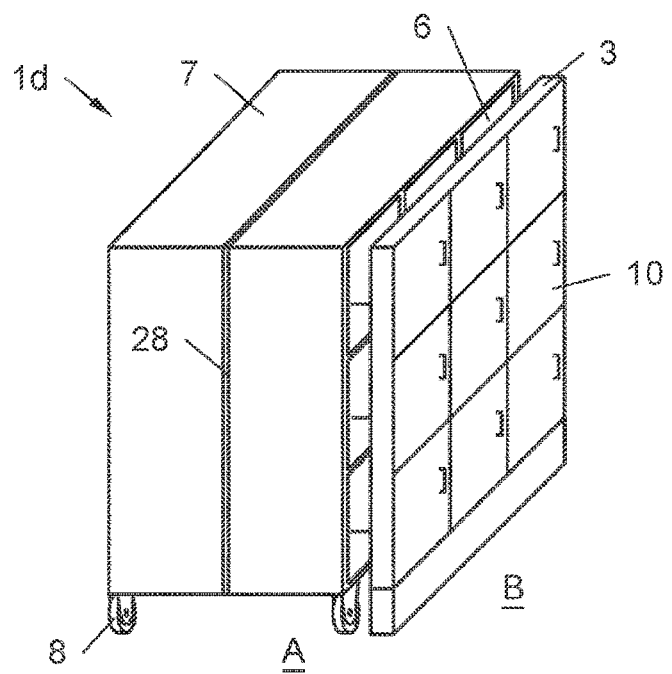
FIG. 6 shows an example of a bilaterally accessible mobile shelf unit positioned in handover position in front of a separating wall with closeable openings.

FIG. 6 shows an example of an alternative mobile shelf unit 7 comprising a central shelf compartment separating wall 28, wherein at least one shelf compartment 6 each is disposed at both sides of the shelf compartment separating wall 28, each of which is accessible only from one side of the mobile shelf unit 7. Depending on the shelf compartment 6 in which the requested article(s) 2 is/are stored, the front side or the rear side of the mobile shelf unit 7 is brought into the handover position. The shelf compartment separating wall 28 prevents, among other things, access by a person to a shelf compartment 6 not associated with him or her.

The dispensing station 1d in this example does not include an article dispensing system 5 disposed directly at the openings 4. As depicted in FIGS. 4 and 5, article dispensing system 5 can be disposed in a different location and can be operatively connected to the doors 10.

Figure 7:
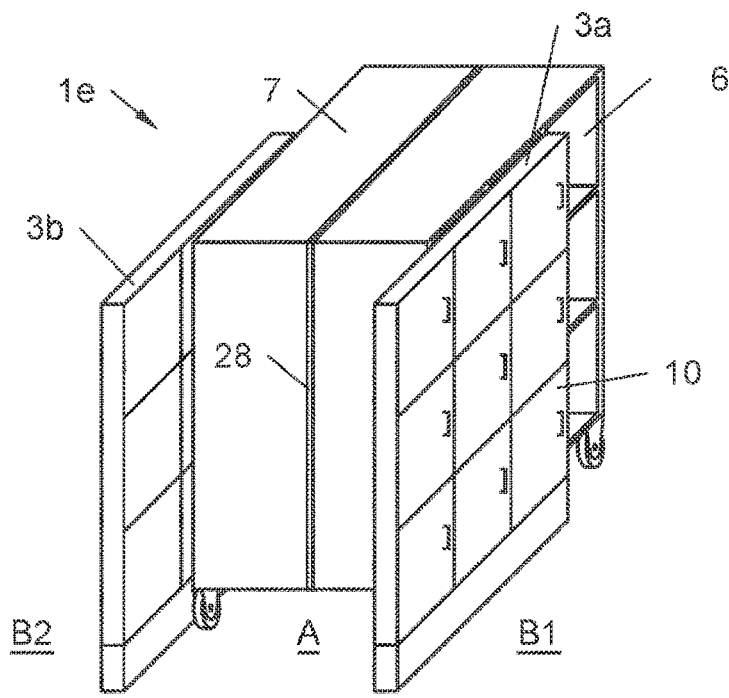
FIG. 7 shows an example of a bilaterally accessible mobile shelf unit positioned between two separating walls with closeable openings.

FIG. 7 shows another alternative embodiment variant of a dispensing station 1e, which is largely similar to the variant shown in FIG. 6. In contrast to the dispensing station shown in FIG. 6, however, two separating walls 3a, 3b are provided, which separate the first article storage region A and the customer access regions B1, B2 from one another and each comprise several closeable openings 4. The doors 10 in the two separating walls 3a, 3b are controlled by the article dispensing system 5 in the manner described above.

The design of the dispensing station 1e is suited in particular for smaller buildings. In particular, the dispensing station 1e can essentially comprise a U-shaped layout accommodating a mobile shelf unit 7 or several mobile shelf units 7 and otherwise comprise an access gate and a roof. If there is room in the dispensing station 1e for several mobile shelf units 7, the mobile shelf units 7 need not be moved for dispensing articles 2 but are only moved during loading and unloading of the dispensing station 1e. In this case, the openings 4 extend not only across one mobile shelf unit 7, but across several mobile shelf units 7.

Evidently, the design proposed for the dispensing station 1e is also suited for unilaterally accessible mobile shelf units 7. At the rear side of the mobile shelf unit 7, the building then only needs to have a normal wall without openings 4 (compare FIGS. 1 and 2).

Figure 8:
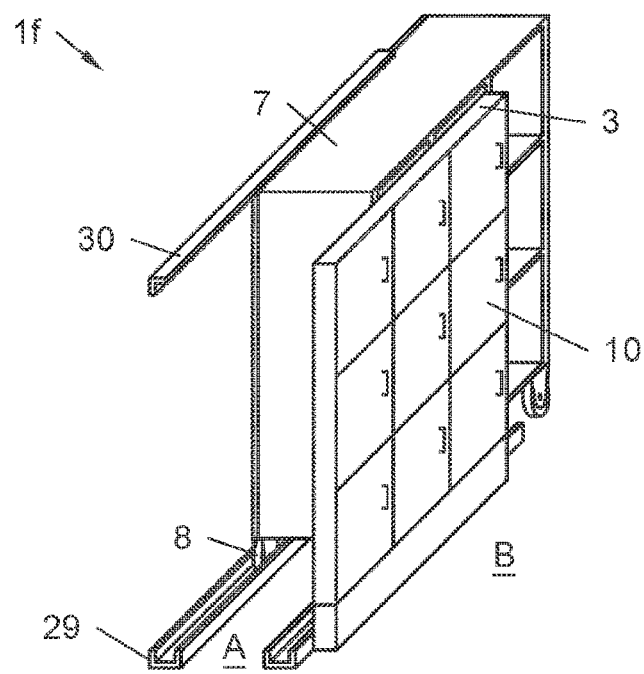
FIG. 8 shows an example of a dispensing station with guide rails for the mobile shelf unit.

FIG. 8 shows an embodiment of a dispensing station if comprising two floor rails 29 in which the wheels 8 of the mobile shelf unit 7 are guided, as well as a guide rail 30 disposed at the top. Both prevent the mobile shelf unit 7 from being pushed away from the separating wall 3 in an unauthorized or unintended manner Evidently, the dispensing station if can also comprise only floor guide rails 29 or only the guide rail 30 disposed at the top, and the guide rails 29, 30 can also have a different shape. Moving shelf unit retainers or shelf unit fixers (compare FIG. 15) can be used as an alternative to the guide rails 29 and/or the guide rail 30.

Figure 9:
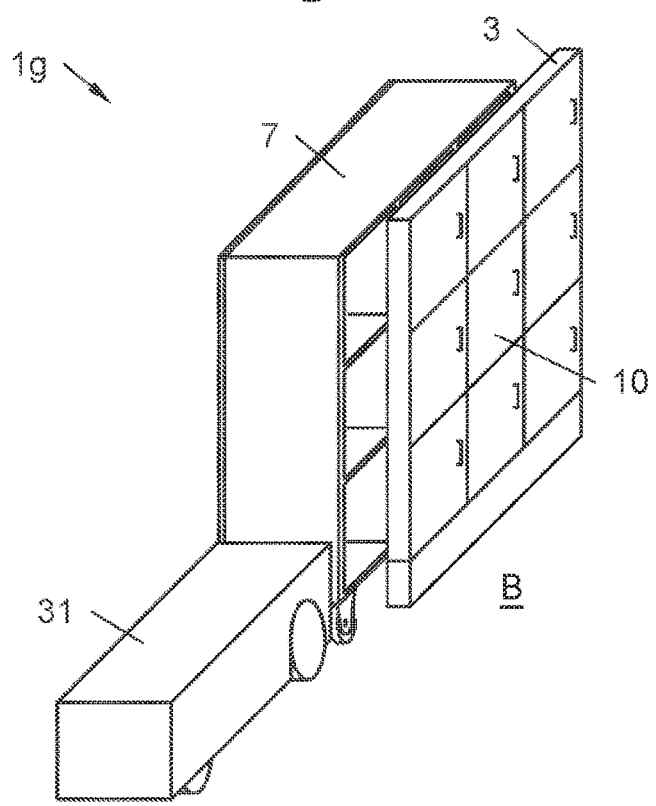
FIG. 9 shows an example of an industrial truck positioning a mobile shelf unit in front of a separating wall with closeable openings.
Figure 10:
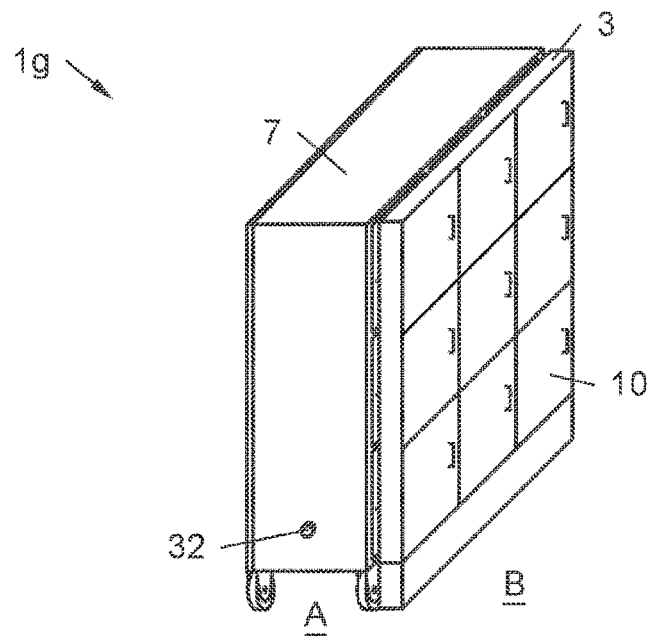
FIG. 10 shows the shelf unit of FIG. 9 in handover position and with visible coupling.

FIG. 9 shows an example, in which the mobile shelf unit 7 is pushed or pulled into the handover position by an industrial truck 31 of a dispensing station 1g. For that purpose the mobile shelf unit 7 comprises a coupling 32 depicted in FIG. 10, where the mobile shelf unit 7 is already in the handover position and the industrial truck 31 has left the first article storage region A. The industrial truck 31 also has an optional coupling, by means of which the mobile shelf unit 7 can be temporarily coupled with the industrial truck 31. In the same way, also several mobile shelf units 7 can be coupled with one another, in particular when they comprise couplings 32 at both sides. In this way, the loading and unloading process of a goods vehicle 18 can for example be sped up, as has been described further above in the context of FIGS. 4 and 5. But also manipulation within the dispensing stations 1*a* . . . 1*g* can be facilitated in this way.

Figure 11:
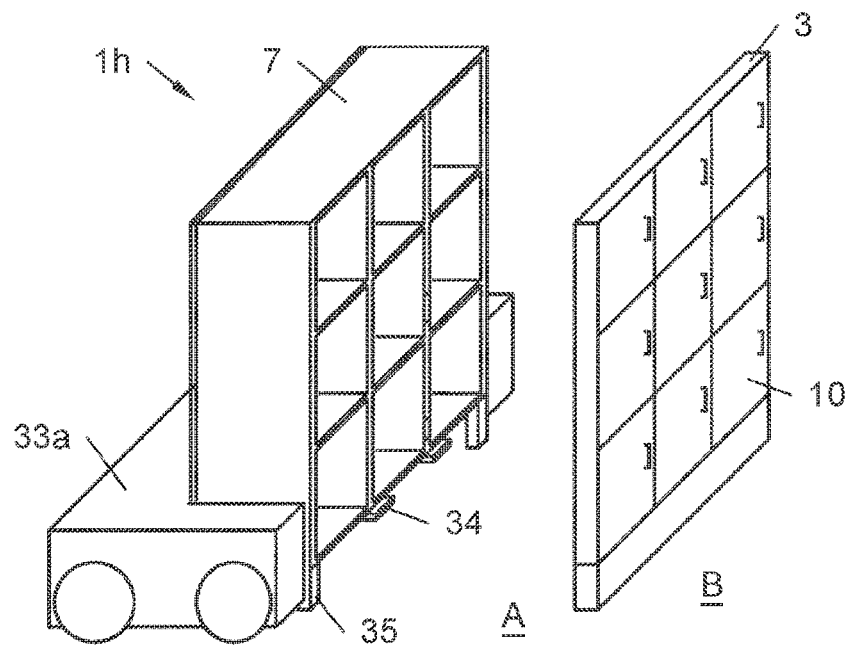
FIG. 11 shows an example of an industrial truck with a lifting fork for lifting the mobile shelf unit traveling in a transverse direction of the mobile shelf unit.

FIG. 11 shows another embodiment, in which an industrial truck 33*a* of a different design is used in a dispensing station 1*h*. Specifically, the industrial truck 33*a* includes a lifting fork 34, which is part of a lifting unit and by means of which the mobile shelf unit 7 can be lifted for conveying. Instead of the lifting fork 34, or in addition to it, the lifting unit can for example also include a lifting strut. The wheels 8 in this mobile shelf unit 7 are therefore replaced by shelf posts and/or shelf feet 35. Evidently, however, a mobile shelf unit 7 with wheels 8 can also be transported by means of the industrial truck 33*a*. Mobile shelf unit 7 with wheels 8 need not necessarily always be lifted but can also be pushed. The industrial truck 33*a* is of a similar design as the industrial devices 17*a* . . . 17*d* symbolically depicted in FIGS. 3 to 5.

Figure 12:
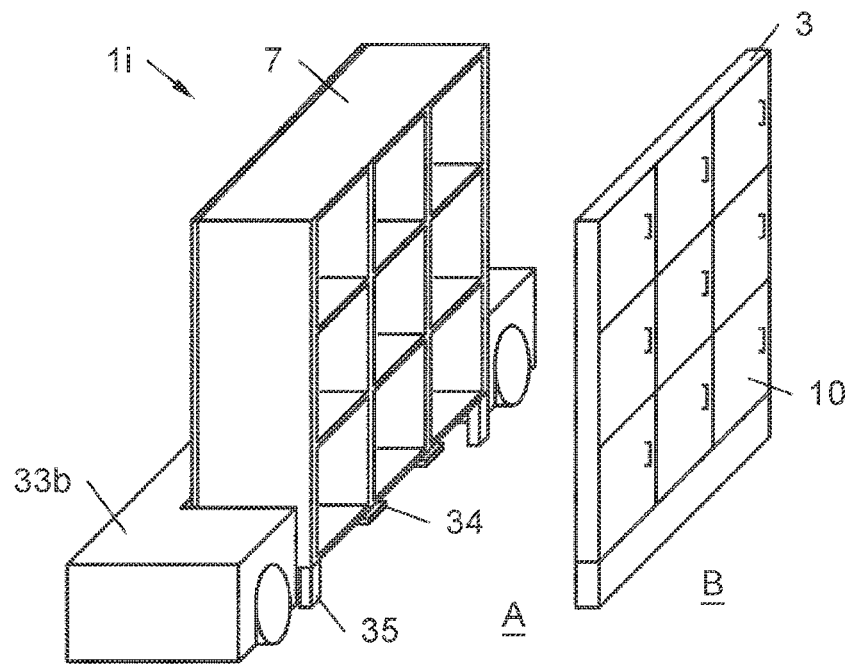
FIG. 12 shows an example of an industrial truck with a lifting fork for lifting the mobile shelf unit traveling in a longitudinal direction of the mobile shelf unit.

FIG. 12 shows a design of an industrial truck 33*b* of a dispensing station 1*i* which is very similar to the industrial truck 33*b* depicted in FIG. 11. In contrast to the industrial truck depicted in FIG. 11, however, it travels in a longitudinal direction of the mobile shelf unit 7. Evidently, the industrial trucks 31, 33*a* and 33*b* depicted in FIGS. 9 to 12 can be used in any combination in a dispensing station 1*a* . . . 1*i*.

Figure 13:
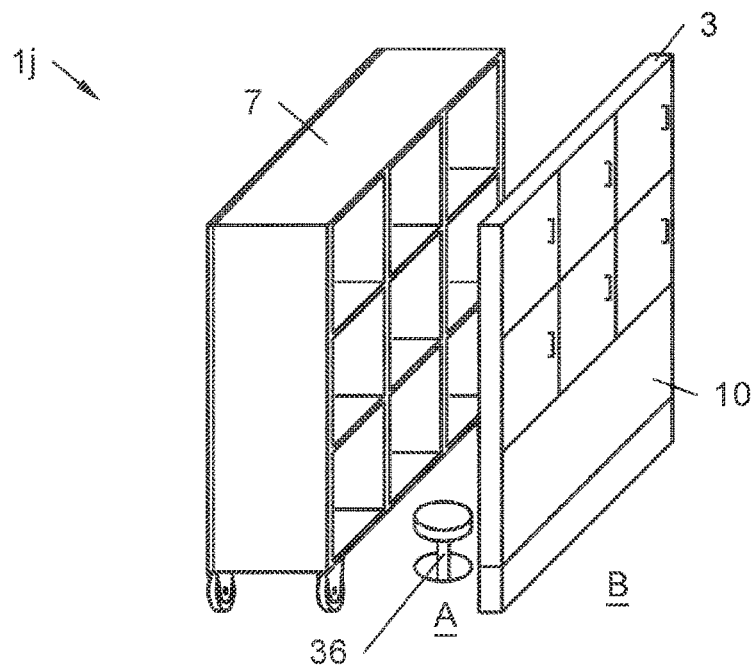
FIG. 13 shows an example of a dispensing station with a lifting device for the mobile shelf unit.
Figure 14:
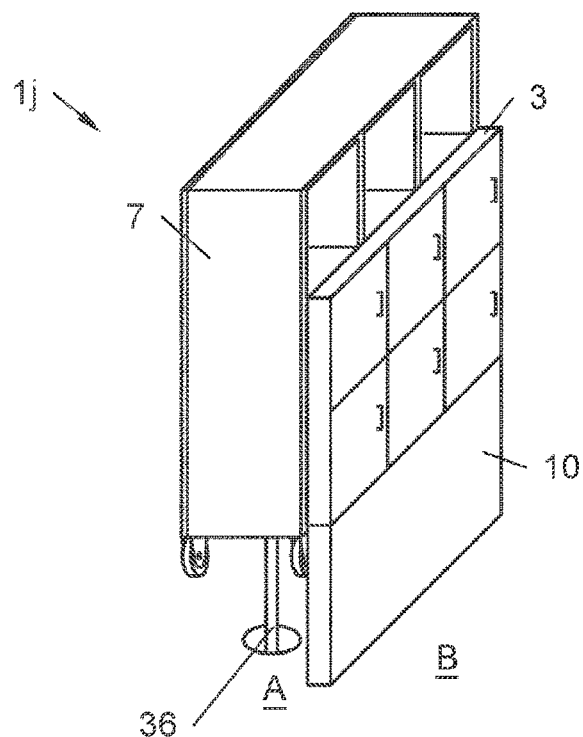
FIG. 14 shows the dispensing station of FIG. 13 with the shelf unit in a lifted position.

FIGS. 13 and 14 show an example of a dispensing station 1*j* including a lifting device 36 for the mobile shelf unit 7 arranged in the first article storage region A. With the help of the lifting device 36, the mobile shelf unit 7 can be moved vertically into a handover position or be moved within different transfer positions as depicted in FIG. 14.

This is advantageous in particular when the area in the separating wall 3 occupied by the openings 4 extends vertically shorter than the shelf compartments 6 of mobile shelf unit 7 are tall. In the example depicted in FIGS. 13 and 14 the lowest row of openings 4 for example is missing compared with the previous illustrations, which means that bending down for transfer of the articles 2 is obsolete.

The proposed procedure can also be applied analogously when the area in the separating wall 3 occupied by the openings 4 extends horizontally shorter than the shelf compartments 6 of the mobile shelf unit 7 are wide. In this case, however, no separate lifting device 36 is required, but the mobile shelf unit 7 is horizontally pushed accordingly (compare also the openings 4*b* of FIG. 4).

The lifting device 36 can include a lifting platform actuated for example by means of a hydraulic cylinder, pneumatic cylinder or electric spindle motor.

Figure 15:
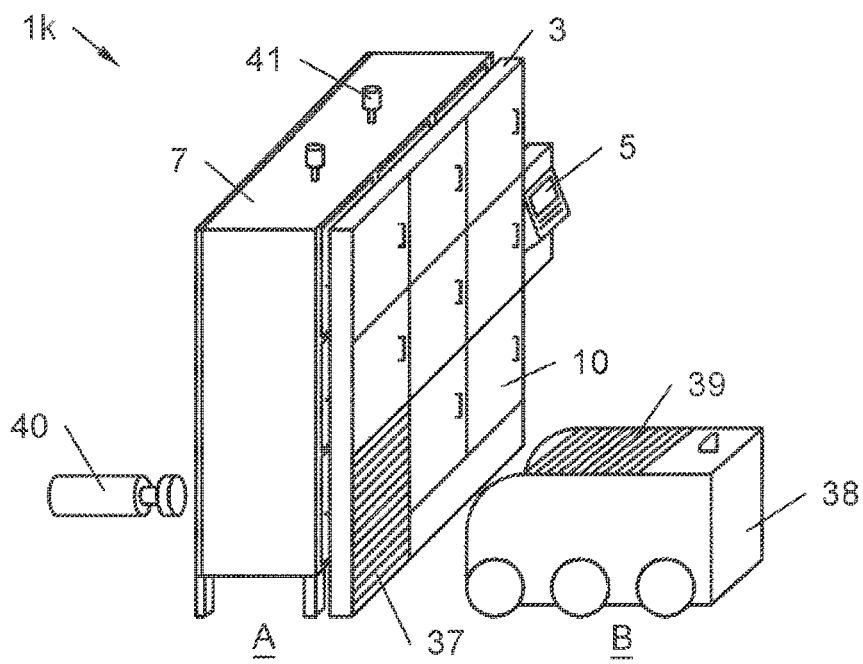
FIG. 15 shows an example of a dispensing station with an interface for an autonomous vehicle.

FIG. 15 shows another embodiment variant of a dispensing station 1*k*, which is similar for example to the dispensing station 1*a* depicted in FIGS. 1 and 2. In contrast to dispensing station 1*a* depicted in FIGS. 1 and 2, however, dispensing station 1*k* comprises a roll-up gate 37 releasing access to the shelf compartment 6 located behind it or not, as the case may be. In the depicted example, an autonomous, mobile vehicle 38 serving as a machine configured for picking up articles has stopped in front of the roll-up gate 37. This vehicle 38 signs in with the article dispensing system 5, preferably wirelessly, and requests picking up the articles 2 associated with the vehicle 38 and/or its holder. The article dispensing system 5 comprises a receiving module configured to receive a request for picking up an article by the vehicle 38 and a control module configured to open the roll-up gate 37 covering an opening, if the vehicle 38 and/or the associated person is authorized for picking up the articles 2. The receiving module is connected with the control module. The article dispensing system 5 can comprise an interface connected with the vehicle 38 in a wireless manner, when it is nearby the dispensing station 1*k*. The interface is connected with the receiving module to receive a request for picking up an article 2, by registration of the vehicle.

In the present case, the vehicle 38 does not have any means for transfer of the articles, such as a gripper or such like. For picking up the articles, merely a cargo space is opened; in the example shown this is done with the help of the roll-up gate 39.

For loading the articles 2 into the vehicle 38, the dispensing station 1*k* includes an ejector 40 configured to move, in particular to push, the articles 2 located in the shelf compartment 6 through the closeable opening 4 of the separating wall 3. To that end, the ejector 40 is instructed accordingly by the article dispensing system 5, if the vehicle 38 is authorized for picking up the articles and if it is recognized that the vehicle 38 has no loading mechanism of its own. During ejection, the ejector 40 protrudes through an opening in the rear wall 9 of the mobile shelf unit 7. The opening in the rear wall 9 can also be configured in such a way that it is open only during ejection of the articles 2 and otherwise closed. For example, a motor-operated cover can be disposed at the rear wall 9, or the cover is actuated directly by the ejector 40.

For the above-mentioned reasons, the ejector 40 can also be considered a simple form of a loading robot. The ejector 40 can be configured for example as a hydraulic cylinder, pneumatic cylinder or electric spindle motor or include same.

In addition, the dispensing station 1*k* comprises optional shelf unit retainers 41, by means of which the position of the mobile shelf unit 7 can be fixed at the handover position. These retainers 41 engage for example with recesses in the mobile shelf unit 7 or simply push mobile shelf unit 7 to the ground. The shelf unit retainers 41 can in particular be provided instead of the rails 29, 30 depicted in FIG. 8 and, again, be configured as a hydraulic cylinders, pneumatic cylinders or electric spindle motors. Application of the shelf unit retainers 41 is of course not bound to the existence of a roll-up gate 37 or of an ejector 40, but the shelf unit retainers 41 can be used also in other designs of a dispensing station 1*a* . . . 1*j*.

Figure 16:
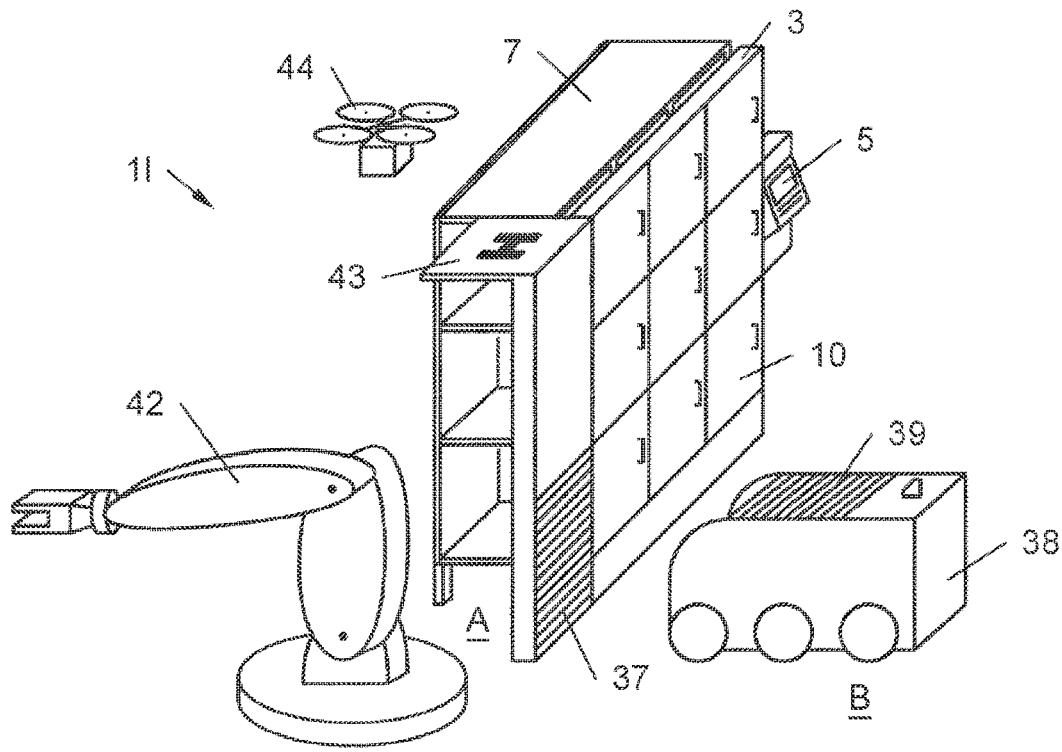
FIG. 16 shows an example of a dispensing station with an interface for an autonomous vehicle and an aerial drone.

FIG. 16 shows an embodiment of a dispensing station 1*l* which is very similar to the dispensing station 1*k* depicted in FIG. 15. In contrast to dispensing station 1*k* depicted in FIG. 15, however, a multi-axis robot 42 with gripper is provided as an exemplary loading robot. Alternatively, also other designs, for example gantry robots, can of course be used as loading robots. As described above in the context of FIG. 15, the article dispensing system 5 opens the roll-up gate 37 if the autonomous vehicle 38 and/or its holder is authorized for picking up the articles 2. In this example, however, the autonomous vehicle 38 is not loaded with the help of an ejector 40, but the autonomous vehicle 38 travels through the now-uncovered opening 4 in the separating wall 3 to the inside of the dispensing station 1*l* to a parking site provided for that purpose. There, the requested articles 2 are removed from the mobile shelf unit 7 and loaded into the autonomous vehicle 38 by the multi-axis robot 42. To that end, the mobile shelf unit 7 is laterally open, as depicted in FIG. 16.

Analogously, it would in principle also be conceivable that the autonomous vehicle 38 can travel through the roll-up gate 37 of the dispensing station 1*k* depicted in FIG. 15 to a parking site provided for that purpose, unless the opening 4 is blocked by a mobile shelf unit 7. The loading robot 42 need therefore not be located close to a handover position for the openings 4 but can in principle be installed anywhere in the dispensing station 1*k*. For transferring the articles 2, the autonomous vehicle 38 then travels on to a parking site located further inside the dispensing station 1k.

In particular, the loading robot 42 can also be formed by the sorting robot 22 depicted in FIG. 5. As described in the context of FIG. 5, the sorting robot 22 can in principle also assume the function of a dispensing robot, which is very similar to the function of a loading robot 42. Thus, several of the functions: sorting robot, dispensing robot and/or loading robot can be carried out by one (single) robot. In FIG. 5 the above-mentioned parking site for the autonomous vehicle 38 can for example be located within the range of action of the storage and retrieval machine 22.

In addition to the components already mentioned, the dispensing station 1l also comprises an optional landing platform 43 for a machine for picking up the articles 2 configured as an aerial drone 44. Loading is done by the multi-axis robot 42 in the manner described above. In particular, it can be provided that the landing platform 43 is vertically movable and the aerial drone 44 can be moved to the inside of the dispensing station 1k in this way. In principle it would also be conceivable that the aerial drone 44 flies to a landing site in the inside of the dispensing station 1k or travels (provided that the aerial drone 44 has a running gear), or is run, to a parking site in the inside of the dispensing station 1k. In this case, the technical teaching disclosed further above in the context of the loading of autonomous vehicles 38 is to be applied analogously.

The dispensing station 1l depicted in FIG. 16 is configured to load autonomous vehicles 38 and to load aerial drones 44. Evidently, the dispensing station 1l can also be configured to load only autonomous vehicles 38 or to load only aerial drones 44, and evidently loading robots 42 with a different design can be used for loading vehicles 38 than for loading aerial drones 44.

It is generally advantageous if the dispensing station 1l includes at least two elements from the group: closeable opening 4, loading robot 42, entrance gate 37 for an autonomous vehicle 38, landing site 43 for an aerial drone 44, as depicted in FIG. 16. The dispensing station 1l can then be used in a particularly flexible manner.

Figure 17:
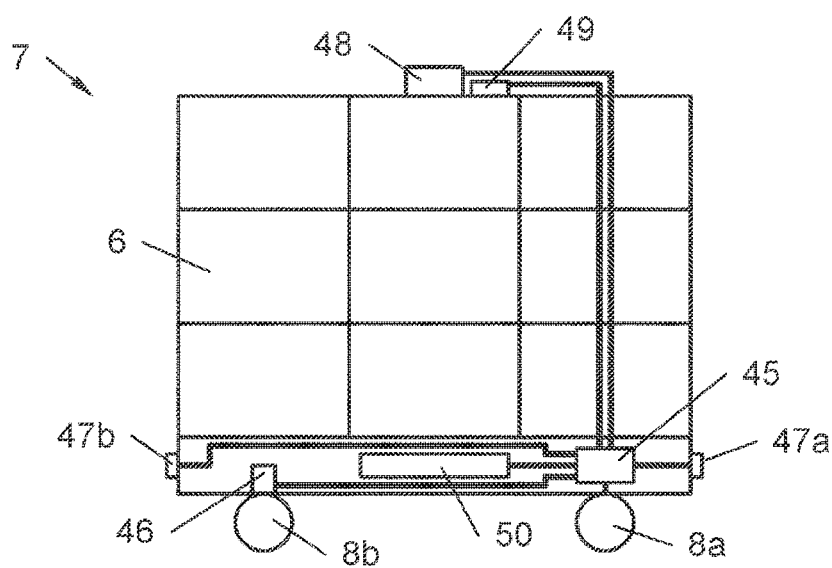
FIG. 17 shows an example of a mobile shelf unit moving autonomously.

FIG. 17 finally shows a design of an autonomous, mobile shelf unit 7 equipped with driven (as well as possibly braked) casters 8a as well as with steerable casters 8b. The driven casters 8a have for example a hub motor which is connected to the drive control 45. Also a steering motor 46 is connected to the drive control 45. Furthermore, the drive control 45 is connected to sensors for spatial orientation, in this specific case to the ultrasonic sensors 47a and 47b, to a laser scanner 48 and a triangulation receiver 49, which can receive for example GPS signals and/or indoor GPS signals. The described system is electrically supplied by an accumulator 50. Alternatively or in addition the mobile shelf unit 7 could also include a camera and/or a magnetic-field sensor.

The described system enables autonomous movement of the mobile shelf unit 7. The method for controlling autonomous vehicles is known in principle and is not described here in detail. In particular, the same, or a similar, method as is known for the industrial trucks 17a . . . 17d, 31, 33a and 33b can be used for the mobile shelf unit 7. As the mobile shelf unit 7 presented in FIG. 17 moves autonomously, industrial trucks 17a . . . 17d, 31, 33a and 33b will be obsolete in the arrangements depicted in FIGS. 3 to 5, or industrial trucks 17a . . . 17d, 31, 33a and 33b can take over special or assistance tasks.

In particular, it can be provided that the autonomous mobile shelf unit 7
travels into a goods vehicle 18 and/or
travels out of a goods vehicle 18 and/or
travels into a handover position in the first article storage region A, A2, A2 and/or
travels into the second article storage region G1 . . . G5.

Evidently, the mobile shelf unit 7 can also be configured in such a way that it can act semi-autonomously. For example, it can be provided that the mobile shelf unit 7 comprises only driven casters 8a and no actively steerable casters 8b. This relieves the strain on a person or an industrial truck 17a . . . 17d, 31, 32, 35 during manipulation of the mobile shelf unit 7 in that driving forces are reduced.

The mobile shelf unit 7, however, can also comprise only actively steerable casters 8b and no driven casters 8a. In this way, the mobile shelf unit 7 can actively steer in a predetermined direction and thus support the steering of the mobile shelf unit 7 by a person or an industrial truck 17a . . . 17d, 31, 33a, 33b. This is advantageous particularly when several mobile shelf units 7 are coupled as a composite, as presented above in the context of loading and unloading a goods vehicle 18. Evidently, however, the mobile shelf units 7 can also be coupled with one another during a different manipulation operation, for example when several mobile shelf units 7 are to be moved to a first article storage region A, A2, A2 or a second article storage region G1 . . . G5.

As mentioned above, a dispensing station 1a . . . 1l without industrial trucks 17a . . . 17d, 31, 33a, 33b is in principle conceivable. Dispensing station 1a . . . 1l then includes essentially only the separating wall 3 with the closeable openings 4, 4a, 4b. Separating wall 3 with the closeable openings 4, 4a, 4b can be installed at the interior or exterior (for example integrated into a small building). Conceivable applications are mail services, delivery services and grocers, in particular also gas stations.

For example, a purchase at a food store can be ordered via the internet, the purchase then being order-picked into a mobile shelf unit 7, 7a . . . 7m by an employee (e.g. during off-peak times) and provisioned in a dispensing station 1a . . . 1l, which is accessible also out of store opening hours. The order placed by a person, for example online, is acquired as an order in the order management system (computer). The dispensing station 1a . . . 1l can be air-conditioned to keep the articles fresh. Orders, for example before noon, can be discounted to encourage customers to place orders in due time. Also, a grocer can for example fill a snack bar at a train station formed by a dispensing station 1a . . . 1l. The compartments 6 can be permanently allocated, or the customer is allocated a compartment number during order generation. The doors 10 can for example be unlocked via near field communication (NFC in short) or Bluetooth. Also one touch screen per compartment door 10 is conceivable.

Instead of equipping the mobile shelf units 7, 7a . . . 7m with casters 8, the goods vehicle 18 and/or the floor of the dispensing station 1a . . . 1l can be equipped with a roller base. It would also be conceivable that the mobile shelf units 7, 7a . . . 7m are conveyed hanging on a rail system, in particular by means of an overhead conveyor.

The mobile shelf units 7, 7a . . . 7m shown in the figures comprise several shelf compartments 6 arranged above one another and next to one another. Specifically, each of said shelf units 7, 7a . . . 7m has three times three compartments 6. Evidently, also other distributions and shapes are conceivable. For example, shelf compartments 6 can be provided which are arranged only above one another or only next to one another. Accordingly, also the separating wall 3, 3, 3b can comprise several closeable openings 4, 4a, 4b arranged above one another and/or next to one another. In particular, also the compartments 6 can be configured in different sizes. Generally, a shelf unit 7, 7a . . . 7m can accommodate several orders. This means that each shelf compartment 6 can be associated with a single order and/or more than one shelf compartment 6, for example two shelf compartments 6, can be associated with one of several orders.

The mobile shelf units 7, 7a . . . 7m can also be freely configurable, i.e. side walls, rear walls or shelves can be removed and added to be able to adapt the mobile shelf unit 7, 7a . . . 7m in an optimal manner to the orders received. This allows for small articles 2 to be accommodated efficiently in the mobile shelf unit 7, 7a . . . 7m, and also storage of long articles can thus be enabled as needed. A mobile shelf unit 7, 7a . . . 7m can also be made up of individual modules.

Moreover, also some of the doors 10 in the separating walls 3 can open together to uncover several shelf compartments 6 or larger shelf compartments 6. For example, several doors 10 with vertical swivel axis or horizontal swivel axis can open together for an order. Also conceivable are pairs of small doors 10 hinged on the left and on the right and/or at the top and at the bottom which can be opened together as needed.

It is also conceivable to use at least two (or more) sliding doors which are moved horizontally and enable access areas of any size in any position. Similarly, also vertical sliding doors are possible. Also a combination of horizontal and vertical sliding doors arranged behind one another is possible. Also, individually activatable grate bars can be integrated with the sliding door to limit the access area in the other dimension. Instead of sliding doors, roll-up walls/gates can be provided for the same purpose.

The shape and/or the geometrical structure of a mobile shelf unit 7, 7a . . . 7m (in particular of a mobile shelf unit of flexibly combined modules) can for example be optically captured by a vertically aligned (optical) line scanner, past which the mobile shelf unit 7, 7a . . . 7m is moved horizontally. Evidently, the shelf unit 7, 7a . . . 7m can analogously be moved vertically past a horizontally aligned (optical) line scanner. Also depth measurement of a mobile shelf unit 7, 7a . . . 7m is possible.

It would also be conceivable that the mobile shelf unit 7, 7a . . . 7m itself stores information on its shape/its geometrical structure and communicates it to the article dispensing system 5. It would be conceivable for example that switching contacts for removable walls are located in a shelf unit frame to acquire where there is a shelf unit wall and where there is none. It would also be conceivable to use microchips which are attached to shelf unit modules and store information on the shape/the geometrical structure of the relevant shelf unit module.

Figure 18:
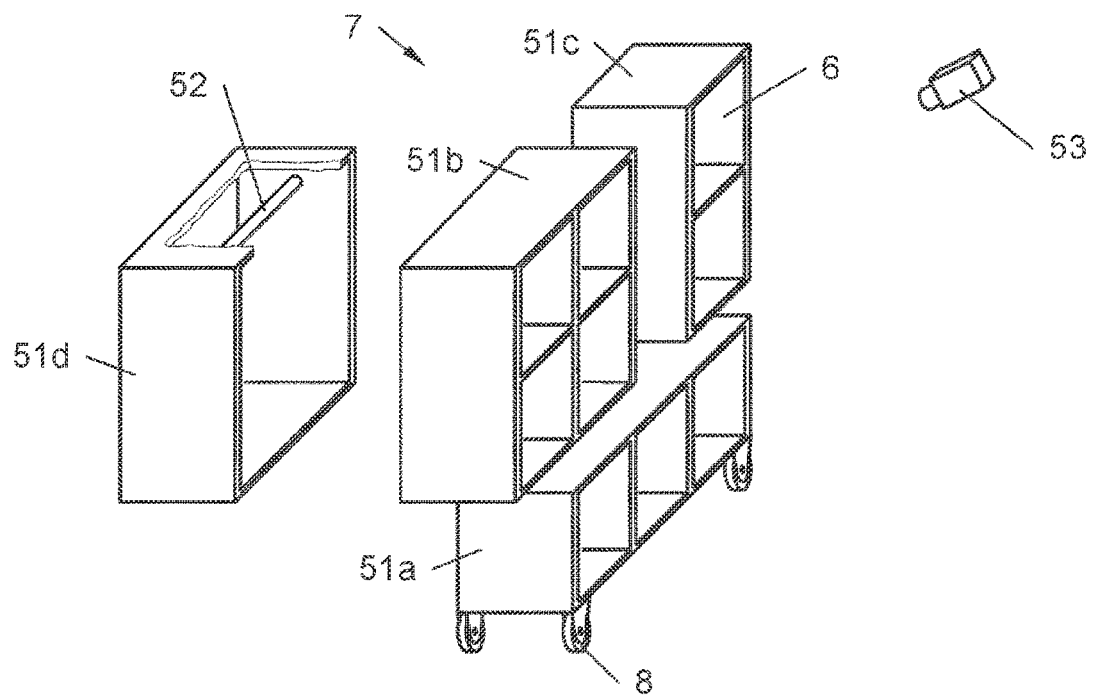
FIG. 18 shows a shelf unit comprising several shelf unit modules of different sizes which are connectable to one another.

In this context, FIG. 18 shows a mobile shelf unit 7 comprising several interconnectable shelf unit modules 51a . . . 51d with shelf compartments 6 of different sizes. Specifically, a first module 51a with 1×3 shelf compartments 6 is depicted in FIG. 18, which is mounted on or comprises casters 8 and onto which a second module 51b with 2×2 compartments 6 and a third module 51c with 2×1 compartments 6 is top-mounted. For example, the modules 51 . . . 51c can be joined by means of a toollessly producible and releasable plug-and-socket connection. Evidently, the depicted distribution of the compartments 6 is to be viewed as purely illustrative, and many other embodiments are also conceivable. In particular, also a bilaterally accessible shelf unit 7 can be made up of modules (compare FIG. 6). In this example, the compartments 6 are configured in the same size, but they could also be of different sizes.

In FIG. 18 an alternative, fourth module 51d is depicted in addition to the second module 51b, which comprises not four compartments 6 but one large compartment 6 with a hanger rod 52, on which hanging garments or hanging bags are hanging. In this case, the use of a hanger rod 52 is not bound to the distribution of items of clothing, but the hanging bags can also contain articles 2 of a general kind. In particular, the hanging bags can be configured as single-use hanging bags, which the customer can take away when picking up the articles 2. However, the hanging bag can also be attached to the hanger rod 52 in a manner undetachable for the customer, so that the customer can take away only the articles 2.

In completely general terms, the use of a hanger rod 52 is evidently not limited to the fourth module 51d, but a hanger rod 52 can be used in all shelf units 7 applicable within the scope of the invention and described therein. In particular, it can also be provided that the shelf unit 7 comprises only a single hanger rod 52.

In FIG. 18 a camera 53 is additionally depicted, which is included in the dispensing station 1a . . . 1l and with the help of which the shape and/or the geometry of the structure of the individually combined shelf unit 7 can be detected. Information re said shape can for example be reported onward to the article dispensing system 5, which can subsequently use article dispensing system 5 to individually uncover openings 4 in the separating wall 3 (compare in this context the embodiments depicted in FIGS. 21 to 29). Instead of the camera 53, or in addition to it, also other optical detection devices and depth measurement devices for capturing the shape/geometry of the structure of the shelf unit 7 can be provided.

Figure 19:
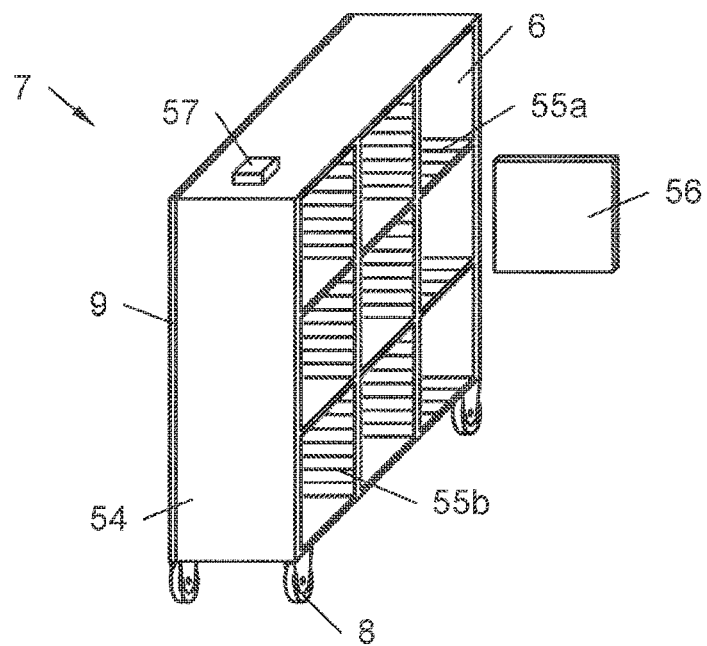
FIG. 19 shows a shelf unit with individually configurable shelf unit separating walls and compartment shelves.
Figure 20:
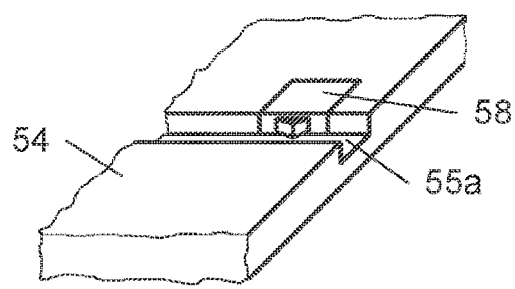
FIG. 20 shows a detailed view of the shelf unit of FIG. 19 with a switch for detecting a shelf unit separating wall.

FIG. 19 shows another embodiment of a shelf unit 7 comprising individually configurable shelf unit separating walls and compartment shelves and/or shelves. To that end, a base body 54 provides grooves 55a in which the shelf unit separating walls can be individually inserted, and grooves 55b in which the compartment shelves can be individually inserted. Purely by way of example, the shelf unit separating wall 56 is depicted in FIG. 19 in this context. It is conceivable that the shelf unit 7 comprises an electronic memory and/or an electronic circuit 57, in which information regarding the shape/geometry of the structure of the mobile shelf unit 7 is stored. For example, switches 58 could be provided in the area of the grooves 55a, by means of which it can be detected whether a shelf unit separating wall 56 is inserted in the relevant groove 55a or not, as depicted in FIG. 20. This information is forwarded, wired or via radio, to the electronic circuit 57, which then makes is available for example to the article dispensing system 5. The article dispensing system 5, in turn, can subsequently use this information to individually uncover openings 4 in the separating wall 3 (in this context compare the embodiments depicted in FIGS. 21 to 29). The switches 58 are of course not limited to the grooves 55a for the separating walls 56 but can in the same way be provided in the grooves 55b for the compartment shelves, or for hanger rods 52. Instead of the grooves 55a, 55b, support battens or support pins for the separating walls 56 and compartment shelves could be provided.

It should be noted in this respect that also the shape and/or the geometry of the structure of the shelf unit 7 depicted in FIG. 19 can be optically detected, for example using a camera 53, as depicted in FIG. 18, or using depth measurement sensors. An electronic memory/an electronic circuit 57 as well as switches 58 will then be obsolete. Conversely, an electronic memory/an electronic circuit 57 can also be applied to the shelf unit 7 depicted in FIG. 18, whereby the camera 53 will be obsolete.

Figure 21:
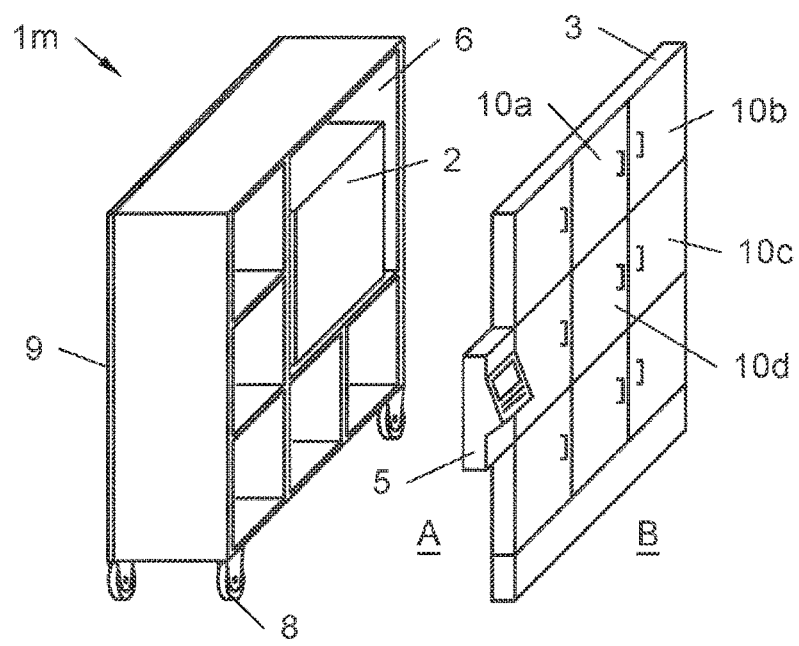
FIG. 21 shows an example of a dispensing station, in which, at a request for picking up articles, several swing doors are released at the same time, in a closed state of the swing doors.
Figure 22:
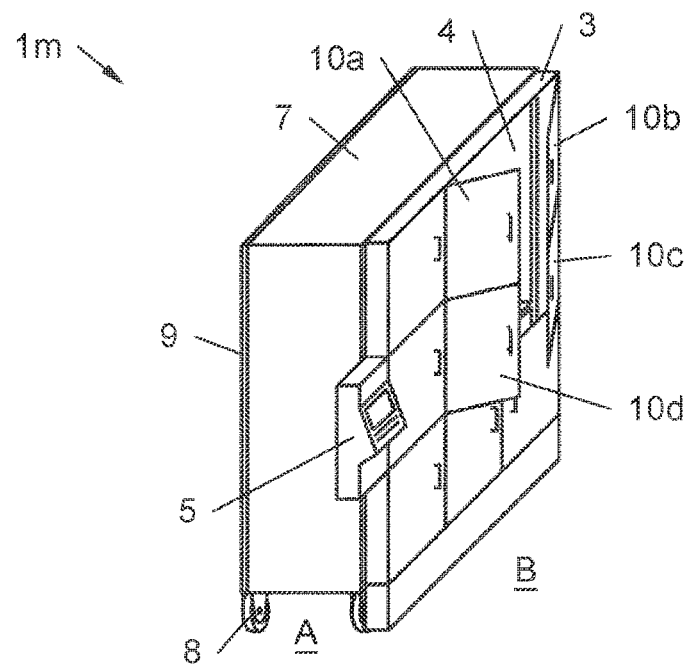
FIG. 22 shows the same as FIG. 21, only with opened swing doors and with the mobile shelf unit in handover position.

In the context of freely configurable separating walls 3, FIGS. 21 and 22 show a first example of a dispensing station 1m, in which the article dispensing system 5 is configured to uncover, individually and depending on the request for picking up the articles 2, a continuous opening 4 of variable size. FIG. 21 shows the arrangement with a shelf unit 7 positioned somewhat apart from and in front of a separating wall 3, FIG. 22 with opened swing doors 10a, 10d and with the mobile shelf unit 7 in handover position.

Specifically, the swing doors 10a . . . 10d provided in the right-hand area of the separating wall 3, which form closing elements for the opening 4, are hinged in opposite pairs. That means that the swivel axis of the left-hand door 10a, 10d of a pair of doors is disposed at the left-hand side of the door 10a, 10d, and the swivel axis of the right-hand door 10b, 10c of a pair of doors is disposed at the right-hand side of the door 10b, 10c.

The article dispensing system 5 is moreover configured to release, at a request for picking up the articles 2, several adjacent swing doors 10a . . . 10d associated with this request. In the specific example it is assumed that the swing doors 10a . . . 10d are associated with an order and are opened together at a request for surrender of the articles 2. This uncovers a relatively large, continuous opening 4 and enables access to a relatively large shelf compartment 6 associated with the order (see FIG. 22). In this way, different-sized openings 4 can be uncovered for different-sized articles 2. In the example shown, the doors 10a . . . 10d can be released individually, in horizontally adjacent pairs, in vertically adjacent pairs or jointly all four—depending on the size of shelf compartment 6 located behind them. It would also be possible to uncover an L-shaped opening 4. By involving the doors arranged at the very bottom, also a 3×1 opening or a 3×2 opening can be uncovered in the depicted example.

In the example shown, the swivel axes of the swing doors 10a . . . 10d are vertically arranged, but it could also be provided that the swing doors 10a . . . 10d disposed in a separating wall 3 are aligned horizontally or in a mix of vertically and horizontally.

Figure 23:
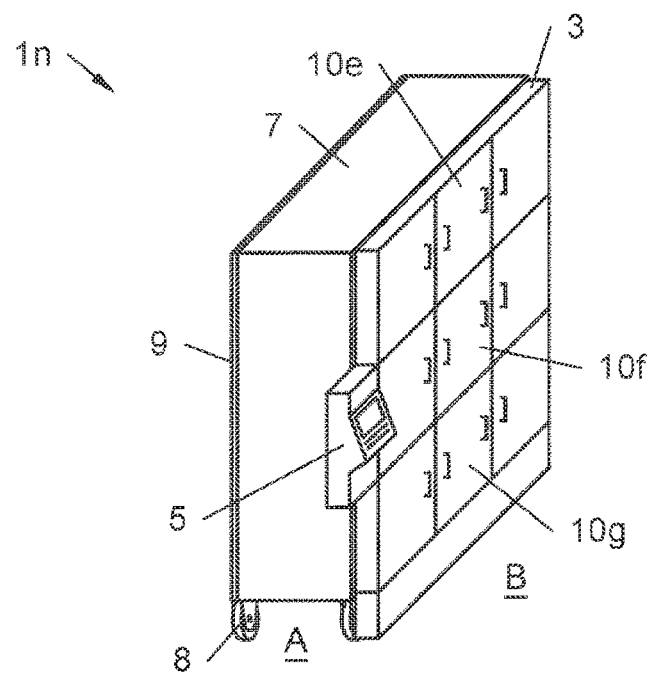
FIG. 23 shows an example of a dispensing station, in which the swing doors can be opened toward the left or toward the right as needed.

FIG. 23 finally shows an example of a dispensing station 1n in which the central swing doors 10e . . . 10g can be opened toward the left or toward the right as needed and which therefore comprise handles at both sides. For example, the swivel axes of the swing doors 10e . . . 10g are formed by shifting bolts which are controlled by the article dispensing system 5. In this way, for example the opening 4 depicted in FIG. 22 can be uncovered when the left-hand swivel axes of the swing doors 10e and 10f are activated. When the right-hand swivel axes of the swing doors 10e and 10f are activated, a 2×2 opening 4 in the left-hand area of the separating wall 3 can be uncovered. Alternatively or in addition to the left-hand/right-hand swivel axis, a top swivel axis and a bottom swivel axis can be individually activated.

Figure 24:
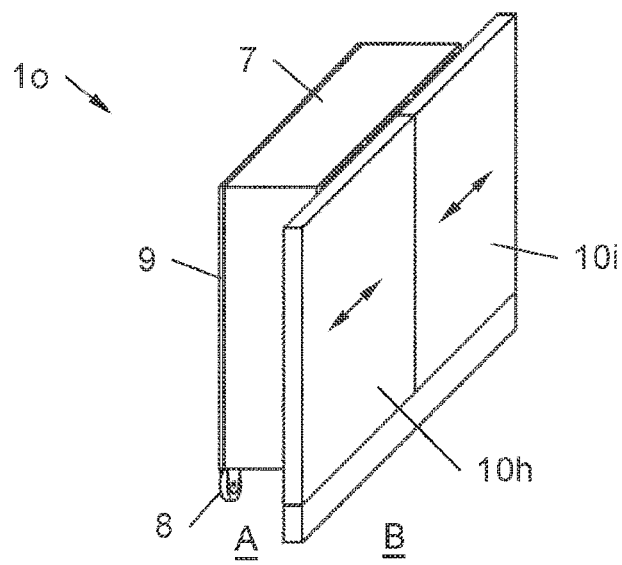
FIG. 24 shows an example of a dispensing station with sliding doors arranged in opposite pairs, in a closed state of the sliding doors.
Figure 25:
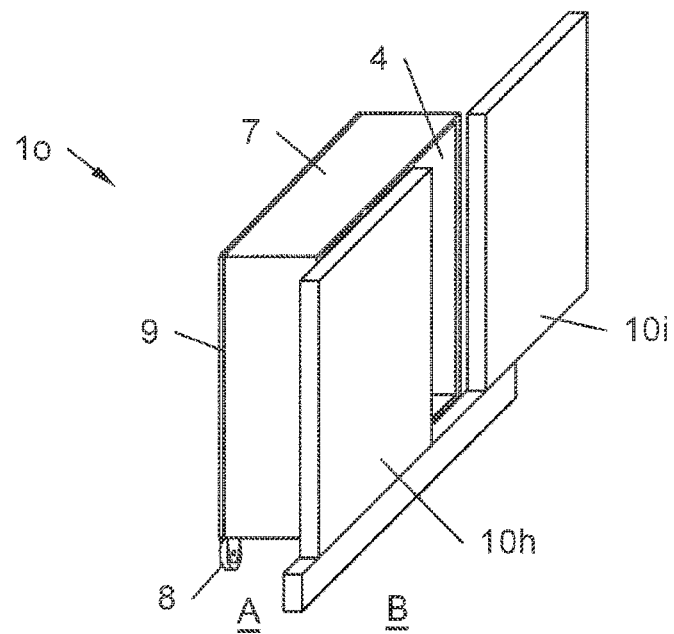
FIG. 25 shows the same as FIG. 24, only with opened sliding doors.

FIG. 24 shows an example of a dispensing station 1o in which the separating wall 3 comprises several closing elements for the opening 4 configured as sliding doors 10h, 10i, which are arranged in opposite pairs. In this case, the article dispensing system 5 is configured in such a way that the sliding doors 10h, 10i are positioned, at a request for picking up the articles 2, in such a way that an opening 4 associated with said request is uncovered. FIG. 25 shows an exemplary case in which an opening 4 disposed in the right-hand area of the separating wall 3 is uncovered and access to a shelf compartment 6 associated with the order is enabled. By positioning the sliding doors 10h, 10i accordingly, a central area or a left-hand area of the separating wall 3 can be uncovered. Generally, the size and position of the uncovered opening 4 can be varied practically continuously. In this case, however, it should be kept in mind that the position and size of the uncovered opening 4 essentially correspond to the shelf compartment 6 disposed behind it. The driving of the sliding doors 10h, 10i can be carried out for example electrically, pneumatically or hydraulically.

In the example depicted in FIGS. 24 and 25, a pair of sliding doors 10h, 10i is provided whose direction of movement (in FIG. 24 depicted by arrows) is aligned horizontally and which are arranged opposite each other in relation to said direction of movement (scenario i). It would therefore be conceivable that the direction of movement of the sliding doors 10h, 10i is vertically aligned, provided that sliding doors 10h, 10i function in an equivalent manner.

Figure 26:
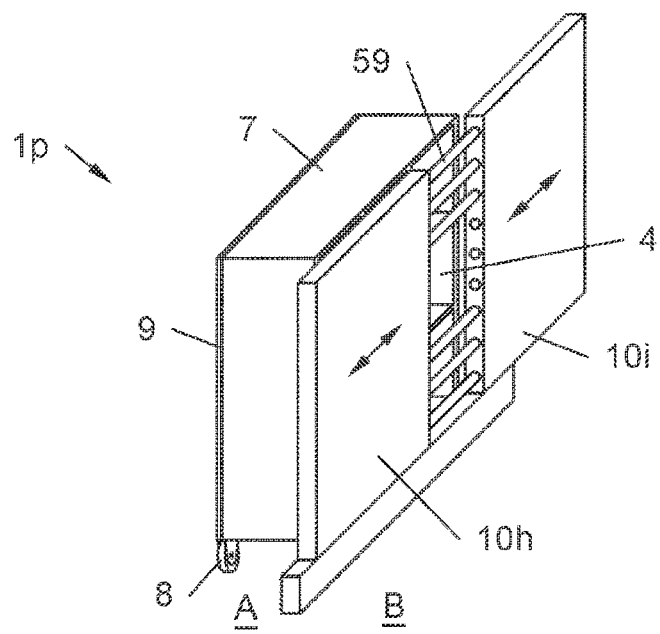
FIG. 26 shows the same as FIG. 24, only with a sliding door including movable grate bars.

FIG. 26 shows another example of a dispensing station 1p, in which the sliding door 10i comprises individually movable grate bars 59 which are movable into a closed position, in which they cover a shelf compartment 6, and are movable into an open position, in which they uncover a shelf compartment 6. In the state depicted in FIG. 26, the grate bars 59 uncover a central shelf compartment 6 but obstruct access to a shelf compartment 6 located at the top and a shelf compartment 6 located at the bottom. In the example shown, the direction of movement of the grate bars 59 is identical with the direction of movement of the sliding door 10i. In principle the direction of movement of the grate bars 59 could, however, also be aligned differently. Moreover, it should be noted that also the sliding door 10h could comprise individually movable grate bars 59. It is furthermore conceivable that, instead of the grate bars 59, individually movable closing plates could be provided for the same purpose. The grate bars 59 and/or closing plates need not necessarily be moved individually but can also be moved in groups. The driving of the grate bars 59/closing plates can be carried out for example electrically, pneumatically or hydraulically. By means of the grate bars 59/closing plates, the size of the uncovered opening 4 can also be varied, wherein it should be ensured, again, that the position and size of the uncovered opening 4 essentially correspond to the shelf compartment 6 arranged behind it.

Figure 27:
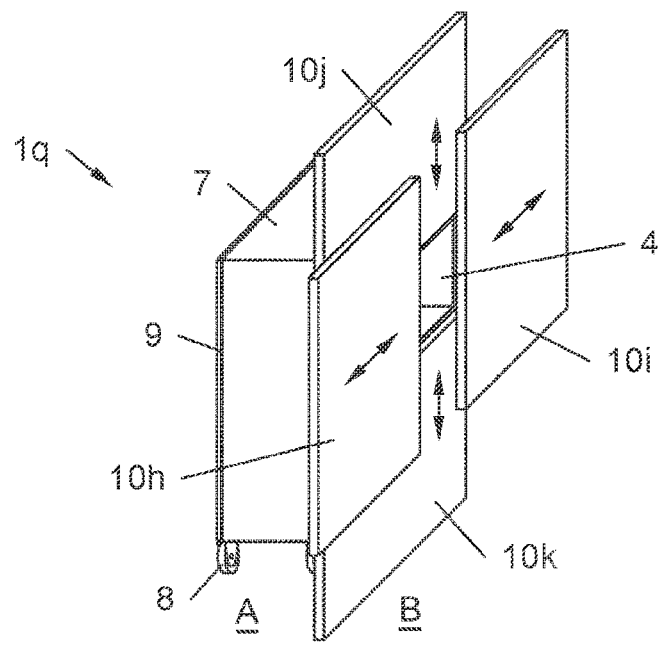
FIG. 27 shows an example of a dispensing station, in which the separating wall comprises a pair of horizontally movable and a pair of vertically movable sliding doors.

FIG. 27 shows another example of a dispensing station 1q, in which a first pair of sliding doors 10h, 10i is provided whose direction of movement is aligned horizontally and which are arranged opposite each other in relation to this horizontal direction of movement (see the horizontal arrows in FIG. 27). Furthermore, a second pair of sliding doors 10j, 10k is provided whose direction of movement is aligned vertically and which are arranged opposite each other in relation to this vertical direction of movement (see the vertical arrows in FIG. 27). The first pair 10h, 10i and the second pair 10j, 10k are arranged behind each other and transversely to said horizontal and said vertical direction of movement (scenario ii). This allows for the opening uncovered by the first pair 10h, 10i to be covered at least in part by the second pair 10j, 10k and vice versa. In the example shown in FIG. 27, a relatively small opening 4 is uncovered in the central area of the separating wall 3. By controlling the sliding doors 10h . . . 10k accordingly, the size and the position of the uncovered opening 4, however, can be varied practically continuously and two-dimensionally. In this case, however, it should, again, be kept in mind that the position and size of the uncovered opening 4 essentially correspond to the shelf compartment 6 disposed behind it. The driving of the sliding doors 10*h* . . . 10*k*, can, again, be carried out for example electrically, pneumatically or hydraulically.

Figure 28:
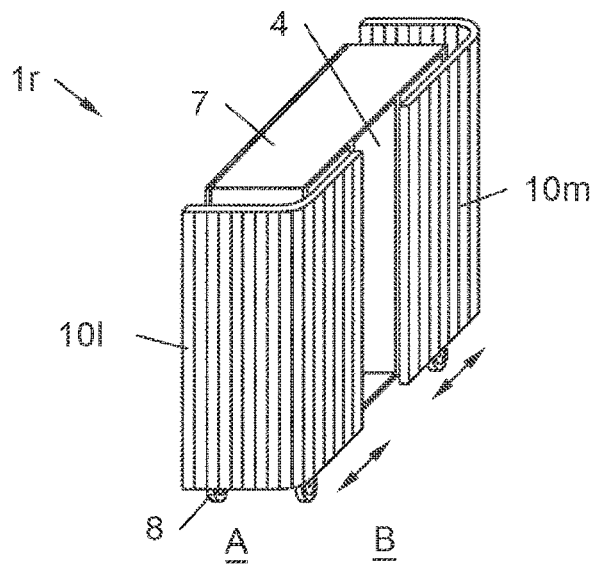
FIG. 28 is similar to FIG. 24, only with roll-up doors instead of sliding doors.

FIG. 28 shows an example of a dispensing station 1*r* which is very similar to the dispensing station 1*o* depicted in FIGS. 24 and 25. Instead of the sliding doors 10*h*, 10*i*, however, rollup doors 10*l*, 10*m* are provided. Also in this embodiment, the size and position of the uncovered opening can be varied practically continuously. The driving, again, can be carried out electrically, pneumatically or hydraulically. What has been said in the context of FIGS. 24 to 27 is, analogously, also true for the embodiment depicted in FIG. 28, wherein a roll-up door 10*l*, 10*m* takes the place of a sliding door 10*h* . . . 10*k*. Advantageously, a rollup door 10*l*, 10*m* takes up less installation space than a sliding door 10*h* . . . 10*k*. The separating wall 3 can therefore be structured in a more compact manner.

Figure 29:
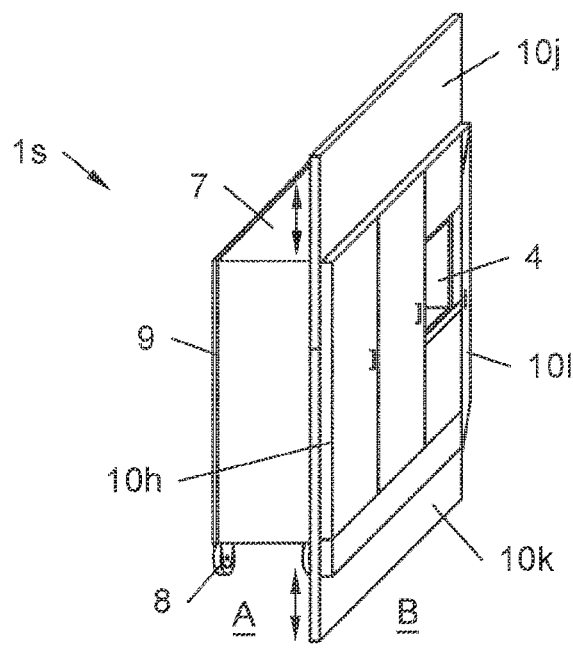
FIG. 29 shows an example of a dispensing station, in which the separating wall comprises sliding doors and swing doors located behind one another.

In FIG. 29, finally, an example of a dispensing station 1*s* is depicted in which a pair of sliding doors 10*j*, 10*k* is provided whose direction of movement is aligned vertically and which are arranged opposite each other in relation to this vertical direction of movement. In addition, the separating wall 3 comprises several swing doors 10*l*, wherein the sliding doors 10*j*, 10*k* and the swing doors 10*l* are arranged behind each other and transversely to said vertical direction of movement (scenario iii). This allows for the opening 4 uncovered by the swing door 10*l* to be covered at least in part by the sliding doors 10*j*, 10*k*. What has been said in the context of FIG. 27 is, analogously, also true for the embodiment depicted in FIG. 29. The place of the sliding door 10*j*, 10*k* can, again, be taken by roll-up doors 10*l*, 10*m* also in this embodiment. The direction of movement of the sliding doors 10*j*, 10*k*/roll-up doors 10*l*, 10*m* could also be aligned horizontally.

With regard to the embodiment variants depicted in FIGS. 21 to 29 and their variations, it should be noted that the shelf units 7 need not necessarily be configured as mobile shelf units 7 movable in relation to the separating wall 3, but the shelf units 7 can also be arranged in a permanent (fixed-installation) manner in relation to the separating wall 3. Particularly advantageous are the embodiment variants depicted in FIGS. 21 to 29 in connection with freely configurable shelf units 7 (in this context see in particular FIGS. 18-20). Furthermore it should be noted that the sliding doors 10*h* . . . 10*k*/roll-up doors 10*l*, 10*m*, while having the same size in each example, can be of different sizes.

Figure 30:
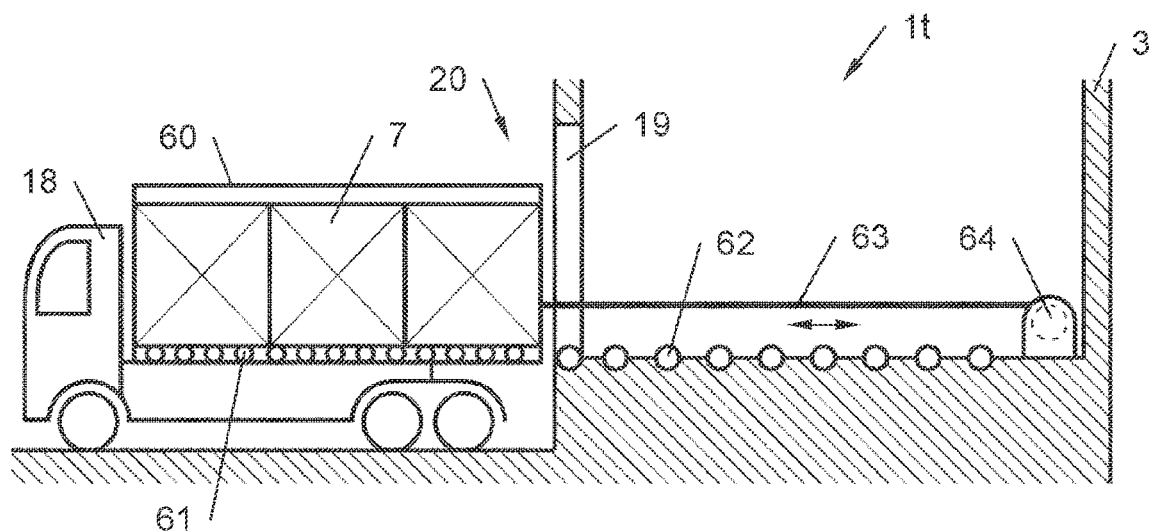
FIG. 30 shows a side view of an exemplary goods vehicle with conveyor rollers in a cargo space and shelf units standing on the conveyor rollers which is parked at a loading dock of a dispensing station.
Figure 31:
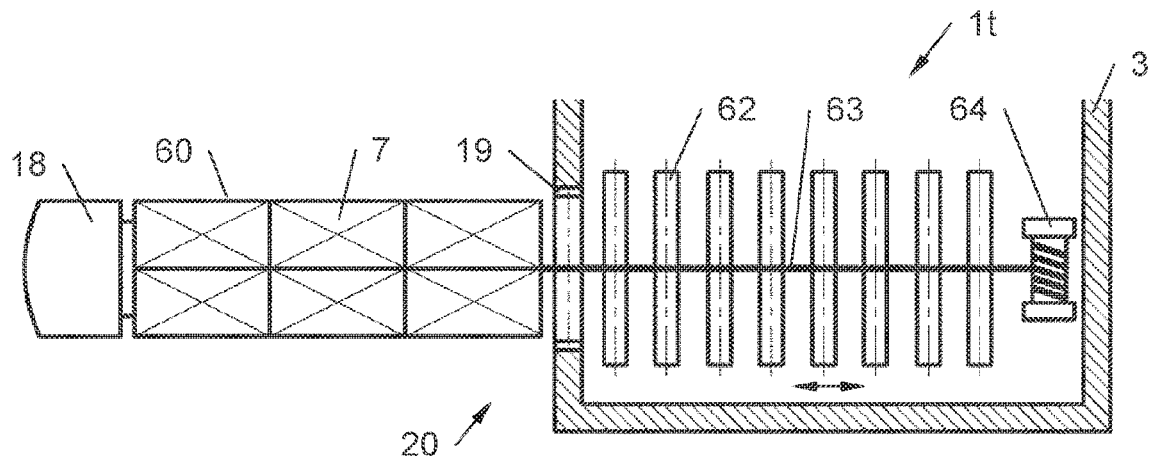
FIG. 31 shows the arrangement of FIG. 30 in a plan view.

FIGS. 30 and 31 show a first example of a goods vehicle 18 with a cargo space 60 and several mobile shelf units 7 accommodated in the cargo space 60, wherein the goods vehicle 18 is parked in a parking area at a loading dock 20 in front of a gate 19 of the dispensing station 1*t*. FIG. 30 shows the arrangement in a side view, FIG. 31 in a plan view. The cargo space 60 comprises conveying means 61, which are in the present example specifically configured as conveyor rollers. For the example it is assumed that these transport rollers 61 are free-running. Free-running transport rollers 62 are also disposed at the floor of the dispensing station 1*t*. The shelf units 7 can be unloaded from the goods vehicle 18 with the help of a cable 63 of a cable winch 64. In this case, it is particularly advantageous if the shelf units 7 are coupled with one another with the help of couplings (compare FIG. 10), as this enables all shelf units 7 to be unloaded at once. After unloading, the shelf units 7 can be taken over by industrial trucks 17*a* . . . 17*d*, and the processes described above in the context of the handover of the articles 2 can be carried out.

Figure 32:
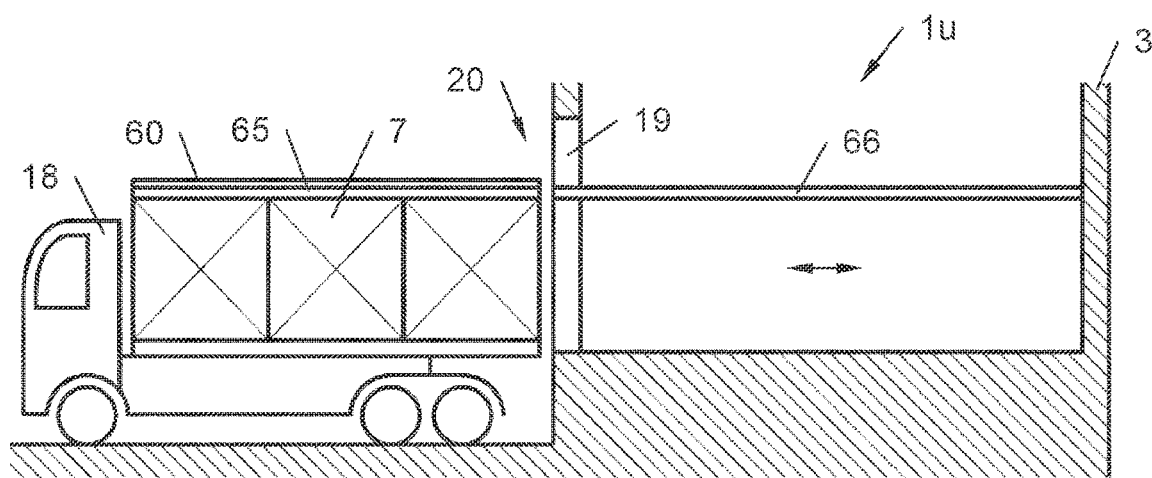
FIG. 32 shows a side view of an exemplary goods vehicle with suspension/support rails in a cargo space and shelf units suspended/hanging on the suspension/support rails which is parked at a loading dock of a dispensing station.
Figure 33:
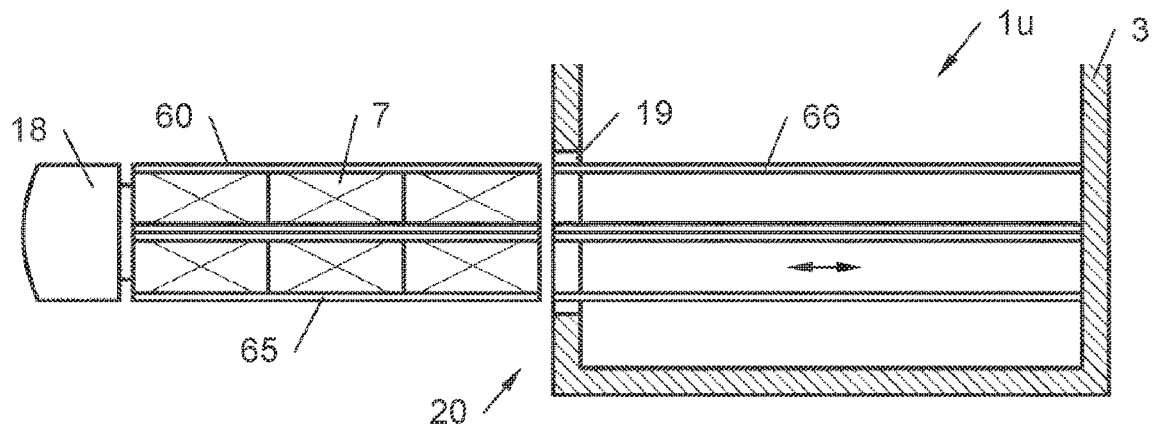
FIG. 33 shows the arrangement of FIG. 32 in a plan view.

FIGS. 32 and 33 show another arrangement, which is very similar to the arrangement depicted in FIGS. 30 and 31. In contrast to the arrangement depicted in FIGS. 30 and 31, however, suspension rails/support rails 65 are provided in the cargo space 60 of the goods vehicle 18 instead of the transport rollers 61 disposed at the floor of the cargo space 60. In an equivalent manner, suspension rails/support rails 66 are provided in the dispensing station 1*u* instead of the transport rollers 62 disposed at the floor. The shelf units 7 are now stored and moved suspended/hanging on the suspension rails/support rails 65, 66. Advantageously, the floor of the cargo space 60 and/or of the dispensing station 1*u* remains free from conveying means 61, 62, which makes it easy for industrial trucks 17*a* . . . 17*d*, 31, 33*a* and 33*b* as well as for autonomous, mobile vehicles 38 to travel on the floor of the cargo space 60 and/or of the dispensing station 1*u*. For easier movement of the shelf units 7, transport rollers can be provided (not depicted) in the suspension rails/support rails 65, 66. For unloading, a cable winch 64 such as the one used in the example depicted in FIGS. 30 and 31 can, again, be provided. Also in this case, the shelf units 7 can be taken over by industrial trucks 17*a* . . . 17*d*, and the processes described above in the context of the handover of the articles 2 can be carried out.

Generally, the transport rollers 61, 62 (as well as conveyor rollers provided in the suspension rails/support rails 65, 66) can be at least semi-driven according to FIGS. 30, 31, 34-36. A cable winch 64 for unloading will then be obsolete. It is also conceivable that, instead of the transport rollers 61, 62, or in addition to them, free-running and/or driven conveyor belts and/or free-running and/or driven conveyor chains are provided in the cargo space 60 and/or in the dispensing station 1*t*, 1*u*. Instead of the cable winch 64, a winch can be provided.

Figure 34:
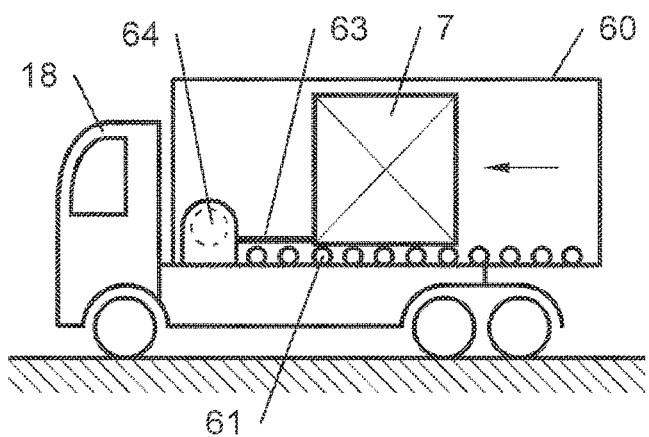
FIG. 34 shows an exemplary goods vehicle with a cable winch for loading a shelf unit into the cargo space.
Figure 35:
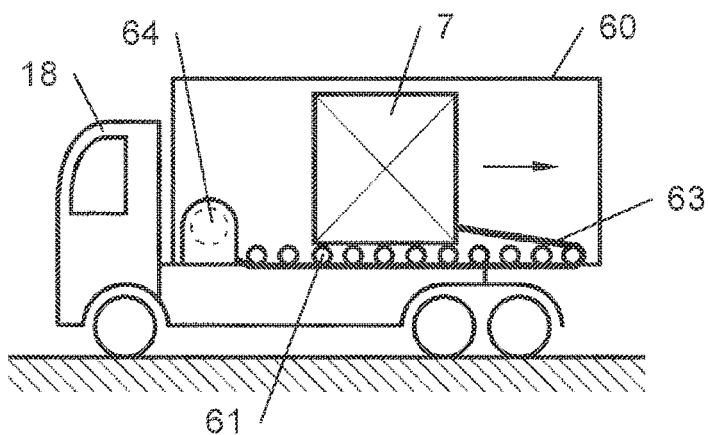
FIG. 35 shows an exemplary goods vehicle with a cable winch for unloading a shelf unit from the cargo space.

FIG. 34 shows an exemplary goods vehicle 18 in which a cable winch 64 for loading the shelf units 7 into the cargo space 60 is provided. However, it is also conceivable that the cable 63 is redirected at the side of the cargo space 60 opposite the cable winch 64 and the cable winch 64 can therefore also be used for unloading the cargo space 60, as depicted in FIG. 35. Also a combination of the embodiments depicted in FIGS. 34 and 35 is conceivable, which enables the cable winch 64 to be used for loading and unloading the goods vehicle 18. In particular, in this case, it is advantageous to use a winch and an endless cable (compare FIG. 36). Similar considerations as for the goods vehicle 18 are also true for the dispensing station 1*t*, 1*u*, whose cable winch 64 can also be used for loading and unloading the goods vehicle 18. The use of a winch with an endless cable 63 is equally conceivable in this case.

Figure 36:
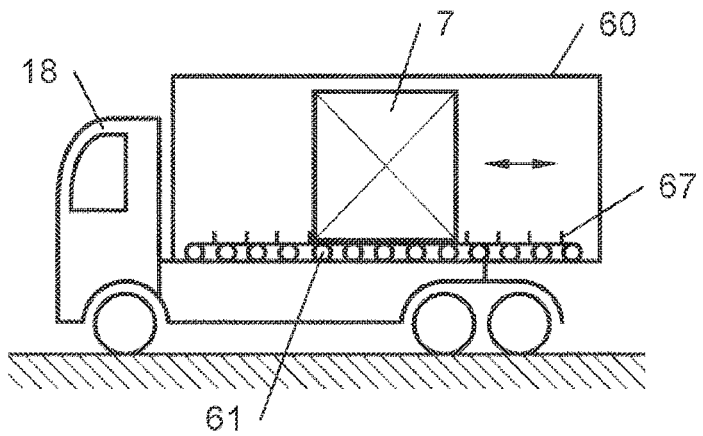
FIG. 36 shows an exemplary goods vehicle with revolving dogs for loading a shelf unit into or from a cargo space.

FIG. 36 finally shows an embodiment of a goods vehicle 18 in which a revolving belt or a revolving chain comprises several dogs 67, with the help of which a shelf unit 7 can be conveyed into the cargo space 60 or out of the cargo space 60. This belt or chain does not necessarily carry the weight of the shelf units 7 but can be provided purely for transmission of a force required to move the shelf units 7. This belt/this chain is therefore also suited for loading and unloading shelf units 7 with casters 8. Load-bearing transport rollers 61, 62, conveyor belts and conveyor chains in the cargo space 60 and in the dispensing station 1*t* will then be obsolete. The revolving belt or the revolving chain with the dogs 67 can of course be disposed in the area of the suspension rails/support rails 65 of the goods vehicle 18, or at the floor of the dispensing station 1*t* and/or in the area of the suspension rails/support rails 66 of the dispensing station 1*u*.

Is should generally be noted that, in all embodiments, the cargo space 60 can be disposed in a container detachable from the goods vehicle 18. In this case, the goods vehicle 18 need not be deposited at the loading dock 20 for the entire duration of the loading or unloading process. Instead, the container comprising the cargo space 60 can be deposited at the loading dock 20 and be reloaded onto the goods vehicle 18 after the loading or unloading process.

It should finally be noted that the first article storage regions A, A1, A2 and/or the second article storage regions G1 . . . G5 can be air-conditioned. This is advantageous in particular when foodstuffs and/or other perishable goods are stored in the mobile shelf units 7, 7*a* . . . 7*m*.

The exemplary embodiments show possible embodiment variants of dispensing stations 1*a* . . . 1*u* and mobile shelf units 7 in accordance with the invention, and it should be noted in this respect that the invention is not restricted to these particular depicted embodiment variants of it, but that rather also various combinations of the individual embodiment variants are possible whose derivation lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

In particular, it should be noted that the depicted arrangements may also include more or fewer parts than depicted and are sometimes depicted in a strongly simplified manner.

Finally, as a matter of form, it should be noted that for ease of understanding of the structure, elements are partially not depicted to scale and/or are enlarged and/or are reduced in size.

| List of Reference Numbers | |
|---|---|
| 1a . . . 1u | dispensing stations |
| 2, 2a, 2b | article(s) |
| 3, 3a, 3b | separating wall |
| 4, 4a, 4b | closeable opening |
| 5, 5a, 5b | article dispensing system |
| 6 | shelf compartment |
| 7, 7a . . . 7m | mobile shelf unit |
| 8, 8a, 8b | caster |
| 9 | shelf compartment end wall |
| 10, 10a . . . 10d | door |
| 11 | article distribution system |
| 12 | article store (high rack) |
| 13 | rail |
| 14 | storage and retrieval machine |
| 15 | conveyor track |
| 16a, 16b | worker |
| 17a . . . 17d | industrial truck |
| 18 | goods vehicle |
| 19 | first gate |
| 20 | first loading dock |
| 21 | access door |
| 22 | sorting robot (multi-level storage and retrieval machine) |
| 23 | rail |
| 24 | fixed shelf unit |
| 25 | second gate |
| 26 | second loading dock |
| 27 | handover opening |
| 28 | shelf compartment separating wall |

| List of Reference Numbers -continued | |
|---|---|
| 29 | floor rail |
| 30 | guide rail |
| 31 | industrial truck |
| 32 | coupling |
| 33a, 33b | industrial truck |
| 34 | lifting unit/lifting fork |
| 35 | shelf post/shelf foot |
| 36 | lifting device |
| 37 | roll-up gate |
| 38 | autonomous, mobile vehicle |
| 39 | roll-up gate |
| 40 | ejector |
| 41 | shelf unit retainer |
| 42 | loading robot (multi-axis robot) |
| 43 | landing platform |
| 44 | aerial drone |
| 45 | drive control |
| 46 | steering motor |
| 47a, 47b | ultrasonic sensor |
| 48 | laser scanner |
| 49 | triangulation receiver |
| 50 | accumulator |
| 51a . . . 51d | shelf unit module |
| 52 | hanger rod |
| 53 | camera |
| 54 | base body |
| 55a, 55b | groove |
| 56 | shelf unit separating wall |
| 57 | electronic memory/electronic circuit |
| 58 | switch |
| 59 | grate bar |
| 60 | cargo space |
| 61 | conveyor roller |
| 62 | conveyor roller |
| 63 | cable |
| 64 | cable winch |
| 65 | suspension/support rails |
| 66 | suspension/support rails |
| 67 | dog |
| A, A1, A2 | first article storage region |
| B, B1, B2 | customer access region |
| C | high rack storage region |
| D | first conveyance region |
| E | order-picking region |
| F | second conveyance region |
| G1 . . . G5 | second article storage region |
| QQ | front view |

The invention claimed is:

1. A method for distributing articles, including the steps of:
receiving by an order management system an order for articles to be delivered to a customer;
transferring the articles of the order from an article store;
order-picking the articles included in the order into at least one shelf compartment of a mobile shelf unit;
transporting the mobile shelf unit to a dispensing station comprising a first article storage region that is separated by a separating wall and a customer access region;
bringing the mobile shelf unit into a handover position in the first article storage region, so that the at least one shelf compartment is accessible via an opening in the separating wall;
providing an article dispensing system configured to:
 receive a request to pick up articles from a person, or a machine associated with a person, the request to pick up the articles being received via a user interface or by registration of the machine,
 allow access to the opening if said person or said machine is authorized to pick up the articles; or instruct a loading robot to take articles of the order out of the at least one shelf compartment and load the articles into said machine, if said person, or said machine, is authorized for picking up the articles.

2. The method according to claim 1, wherein, after the order-picking of the articles into the mobile shelf unit, the mobile shelf unit is transported to the dispensing station by a goods vehicle, and the mobile shelf unit is unloaded from the goods vehicle at the dispensing station.

3. The method according to claim 1, wherein the mobile shelf unit is moved vertically into the handover position by a lifting device that is arranged in the first article storage region.

4. The method according to claim 1, wherein the articles located in a shelf compartment are transferred by an ejector through the opening of the separating wall into a cargo space of the machine.

5. The method according to claim 1, wherein, after order-picking the articles into the mobile shelf unit, taking at least one picked article out of the at least one shelf compartment of the mobile shelf unit by a sorting robot and depositing the at least one picked article in at least one shelf compartment of a second shelf unit.

6. The method according to claim 5, wherein the second shelf unit is configured to be a mobile shelf unit, wherein the second mobile shelf unit takes the place of the first mobile shelf unit, and is transported to the dispensing station.

7. The method according to claim 1, wherein during the step of transporting the mobile shelf unit to the dispensing station, the method further comprises:
    transporting the mobile shelf unit into a second article storage region located away from said separating wall via an industrial truck; and
    bringing the mobile shelf unit from the second article storage region into the handover position when the article dispensing system receives the request for picking up the articles located in the mobile shelf unit for delivery to the customer.

8. A dispensing station for distributing articles, including:
a first article storage region;
a customer access region;
a mobile shelf unit having shelf compartments;
a first separating wall that separates the first article storage region and the customer access region, the first separating wall comprising at least one opening;
an article dispensing system configured to:
    receive a request to pick up the articles by a person, or a machine associated with a person, the request to pick up the articles being received via a user interface or by registration of the machine,
    allow access to an opening if said person or said machine is authorized to pick up the articles, or
    instruct a loading robot of the dispensing station to transfer articles of an order out of the at least one shelf compartment of the mobile shelf unit, and to load the articles into said machine if said person or said machine is authorized to pick up the articles;
wherein the mobile shelf unit is in a handover position when at least one shelf compartment of the mobile shelf unit is accessible via the at least one opening in the first separating wall.

9. The dispensing station according to claim 8, wherein:
the machine for picking up articles is an aerial drone, and the dispensing station comprises a landing site for the aerial drone, wherein the loading robot is configured to load the aerial drone; and/or
the machine for picking up articles is an autonomous, movable vehicle, and the dispensing station comprises a parking site for the vehicle, wherein the loading robot is configured to load the vehicle at the parking site.

10. The dispensing station according to claim 8, wherein the mobile shelf unit comprises at a rear side a shelf compartment end wall and the at least one shelf compartment is arranged adjacent to the shelf compartment end wall and is accessible only from one side of the mobile shelf unit.

11. The dispensing station according to claim 8, wherein the mobile shelf unit comprises a central shelf compartment separating wall, and at least one shelf compartment is disposed at both sides of the shelf compartment separating wall, wherein each shelf compartment that is disposed on one side of the shelf compartment separating wall is accessible from only one side of the mobile shelf unit.

12. The dispensing station according to claim 11, further comprising:
    a second separating wall with at least one opening that separates the first article storage region and the customer access region;
    wherein the mobile shelf unit is in a handover position when a first shelf compartment of the mobile shelf unit is accessible via the opening in the first separating wall and a second shelf compartment of the mobile shelf unit that is separated from the first shelf compartment by the central shelf compartment separating wall is accessible via the opening in the second separating wall.

13. The dispensing station according to claim 12, further comprising an ejector configured to move the articles located in a shelf compartment through the opening of the first or second separating wall.

14. The dispensing station according to claim 8, wherein the mobile shelf unit comprises a hanger rod for accommodating hanging garments and/or hanging bags.

15. The dispensing station according to claim 8,
    wherein the mobile shelf unit comprises at least one of:
        individually configurable shelf unit separating walls; rear walls; compartment shelves; hanger rods; or
    wherein the mobile shelf unit comprises: several interconnectable modules with shelf compartments of different sizes.

16. The dispensing station according to claim 8, wherein the mobile shelf unit can be temporarily connected to another mobile shelf unit with a coupling.

17. The dispensing station according to claim 8, further comprising at least two elements from the group consisting of: the at least one opening, the loading robot, an entrance gate for an autonomous vehicle, and a landing site for an aerial drone.

18. The dispensing station according to claim 8, further comprising a sorting robot configured to:
    take the articles of the order from the at least one shelf compartment of the mobile shelf unit, and
    deposit the articles into at least one shelf compartment of another shelf unit.

19. The dispensing station according to claim 18, wherein the other shelf unit is configured to be:
    a mobile shelf unit, or
    a fixed shelf unit.

20. The dispensing station according to claim 8, further comprising a lifting device to lift the mobile shelf unit into the handover position in the first article storage region.

21. The dispensing station according to claim 8, wherein an industrial truck transports the mobile shelf unit into a second article storage region that is located away from said first separating wall, and brings the mobile shelf unit into the handover position when the article dispensing system receives the request for picking up articles that have been loaded into the mobile shelf unit.

22. A dispensing station for distributing articles, including:
- a first article storage region;
- a customer access region;
- a mobile shelf unit having shelf compartments;
- a separating wall that separates the first article storage region and the customer access region, the separating wall comprising at least one opening;
- an article dispensing system configured to:
  - receive a request to pick up the articles by a person, or a machine associated with a person, the request to pick up the articles being received via a user interface or by registration of the machine,
  - allow access to at least one opening if said person or said machine is authorized to pick up the articles, or
  - instruct a loading robot of the dispensing station to transfer articles of an order out of the at least one shelf compartment of the mobile shelf unit, and to load the articles into said machine if said person or said machine is authorized to pick up the articles;
- wherein the mobile shelf unit is in a handover position when at least one shelf compartment of the mobile shelf unit is accessible via the at least one opening in the separating wall; and
- wherein the machine for picking up articles is an aerial drone, the dispensing station further comprising a landing site for the aerial drone, wherein the loading robot is configured to load the aerial drone; and/or
- wherein the machine for picking up articles is an autonomous, movable vehicle, the dispensing station further comprising a parking site for the vehicle, wherein the loading robot is configured to load the vehicle at the parking site.

23. A method for distributing articles, including the steps of:
- order-picking the articles included in an order into at least one shelf compartment of a shelf unit,
- transporting the shelf unit into a handover position in a first article storage region of a dispensing station, or providing the shelf unit in a handover position in a first article storage region of a dispensing station;
- wherein the shelf unit is in the handover position when the at least one shelf compartment is accessible via an opening in a separating wall;
- wherein the separating door has swing doors;
- wherein the dispensing station comprises a first article storage region that is separated from a customer access region by the separating wall;
- the method further comprising the step of:
- providing an article dispensing system, configured to:
  - receive a request to pick up articles from a person, or a machine associated with a person, the request to pick up the articles received via a user interface or by registration of the machine,
  - allow access to the opening if said person or said machine is authorized to pick up the articles, and depending on the request for picking up the articles and, wherein the access to the opening comprises:
  - i) an access to an individual opening by opening several adjacent swing doors assigned to the request for picking up the articles, which cover the individual opening disposed in the separating wall; or
  - ii) an access to a continuous opening having a plurality of adjacent openings by opening several adjacent swing doors assigned to the request for picking up the articles, which cover the continuous opening disposed in the separating wall.

24. The method according to claim 23, wherein upon receiving the request for picking up the articles, the article dispensing system activates a swivel axis of several swivel axes of a swing door, and deactivates the remaining swivel axes of this swing door.

25. The method according to claim 23, wherein upon the request for picking up the articles, the article dispensing system positions several sliding doors, or roll-up doors in the separating wall, in pairs, so that an opening associated with the requested articles can be accessed.

26. The method according to claim 25, wherein upon receiving the request for picking up the articles, the article dispensing system positions grate bars or closing plates of the sliding doors or roll-up doors so that an opening assigned to the request to pick up the articles can be accessed.

27. The method according to claim 23, wherein at least some of the swing doors are hinged in opposite pairs.

28. A dispensing station for distributing articles, including:
- a first article storage region;
- a customer access region;
- a separating wall that separates the first article storage region and the customer access region, the separating wall comprising at least one opening to several shelf compartments, and several swing doors for covering the at least one opening;
- a shelf unit with the several shelf compartments accessible via the at least one opening in the separating wall; and
- an article dispensing system configured to:
  - receive a request to pick up the articles by a person, or a machine associated with a person, the request to pick up the articles being received via a user interface or by registration of the machine, and
  - allow access to an opening if said person or said machine is authorized to pick up the articles;
- wherein the access to the opening comprises:
  - i) an access to an individual opening by releasing several adjacent swing doors assigned to the request for picking up the articles, which cover the individual opening disposed in the separating wall,
  - ii) an access to a continuous opening having adjacent openings by releasing several adjacent swing doors assigned to the request for picking up the articles, which cover the continuous opening disposed in the separating wall.

29. The dispensing station according to claim 28, wherein the individual opening is, or the continuous opening having a plurality of openings is, associated with a continuous shelf compartment.

30. The dispensing station according to claim 28, wherein the swivel axes of the swing doors are aligned vertically, horizontally, or in a mix of vertically and horizontally.

31. The dispensing station according to claim 28,
- wherein the separating wall comprises several sliding doors or roll-up doors for covering the at least one opening, the sliding or roll-up doors being arranged in opposite pairs; and
- wherein the article dispensing system is configured to position, upon receiving the request for picking up the articles, the sliding or roll-up doors so that an opening assigned to the request to pick up the articles can be accessed.

32. The dispensing station according to claim 31, further comprising a pair of sliding or roll-up doors that are designed to move horizontally or vertically, and wherein the pair of sliding or roll-up doors are arranged opposite each other; wherein the sliding or roll-up doors, and the swing doors are arranged one behind another; and wherein the swing doors are arranged in a transverse direction to the sliding or roll-up doors.

33. The dispensing station according to claim 31, wherein at least one sliding door or roll-up door comprises individually movable grate bars or closing plates movable into
   a closed position that covers a shelf compartment, and
   an open position that allows access to a shelf compartment.

34. The dispensing station according to claim 28, wherein the shelf unit is arranged in a fixed manner in relation to the separating wall.

35. The dispensing station according to claim 28, wherein the shelf unit is configured as a mobile shelf unit, and is movable in relation to the separating wall, into a handover position, wherein in the handover position at least one shelf compartment of the mobile shelf unit is accessible via the opening in the separating wall.

36. The method according to claim 28, wherein the shelf unit is configured as a mobile shelf unit, and wherein the mobile shelf unit that has been loaded with the picked articles, is transported into a second article storage region that is located away from said separating wall by an industrial truck, and wherein the mobile shelf unit is brought into the handover position when the article dispensing system receives the request for picking up the articles located in the mobile shelf unit for delivery to the customer.

37. The method according to claim 36, further comprising a first mobile shelf unit and a second mobile shelf unit;
   wherein the articles in the at least one shelf compartment of the first mobile shelf unit are taken out of at least one shelf compartment by a sorting robot and deposited into at least one shelf compartment of the second shelf unit;
   wherein the second shelf unit takes the place of the first mobile shelf unit, and is transported to the dispensing station to deliver the articles.

38. The method according to claim 28, further comprising a first mobile shelf unit and a second mobile shelf unit, and
   wherein the articles that have been loaded in the at least one shelf compartment of the first mobile shelf unit are taken out of the at least one shelf compartment by a sorting robot, and deposited in at least one shelf compartment of the second shelf unit;
   wherein the second shelf unit takes the place of the first mobile shelf unit, and is transported to the dispensing station to deliver the articles.

39. The dispensing station according to claim 28, wherein the shelf unit is configured as a mobile shelf unit; the dispensing station further comprising:
   a second article storage region that is located away from said separating wall; and
   an industrial truck for transporting the mobile shelf unit that has been loaded with picked articles into the second article storage region; and
   wherein the mobile shelf unit is brought into the handover position when the article dispensing system receives the request for picking up the articles located in the mobile shelf unit for delivery to the customer.

40. The dispensing station according to claim 39, wherein the shelf unit is configured as a mobile shelf unit, and comprises a hanger rod for accommodating hanging garments and/or hanging bags.

41. The dispensing station according to claim 39, wherein the shelf unit is configured to be a mobile shelf unit,
   wherein the mobile shelf unit comprises at least one of: individually configurable shelf unit separating walls; rear walls; compartment shelves; hanger rods; or
   wherein the mobile shelf unit comprises: several interconnectable modules with shelf compartments of different sizes.

42. The dispensing station according to claim 28, wherein the shelf unit is configured as a mobile shelf unit, and comprises a hanger rod for accommodating hanging garments and/or hanging bags.

43. The dispensing station according to claim 42, wherein the shelf unit is configured to be a mobile shelf unit,
   wherein the mobile shelf unit comprises at least one of: individually configurable shelf unit separating walls; rear walls; compartment shelves; hanger rods; or
   wherein the mobile shelf unit comprises: several interconnectable modules with shelf compartments of different sizes.

44. The dispensing station according to claim 28, wherein the shelf unit is configured to be a mobile shelf unit,
   wherein the mobile shelf unit comprises at least one of: individually configurable shelf unit separating walls; rear walls; compartment shelves; hanger rods; or
   wherein the mobile shelf unit comprises: several interconnectable modules with shelf compartments of different sizes.

45. The method according to claim 28, wherein at least some of the swing doors are hinged in opposite pairs.

* * * * *